Feb. 9, 1960 T. BACKUS ET AL 2,924,111
AUTOMOTIVE DEVICE
Filed July 5, 1957 18 Sheets-Sheet 1

INVENTORS
THOMAS BACKUS
CHARLES M. PERKINS
PIETER J. VISSER
BY
Woodhams Blanchard & Flynn
ATTORNEYS

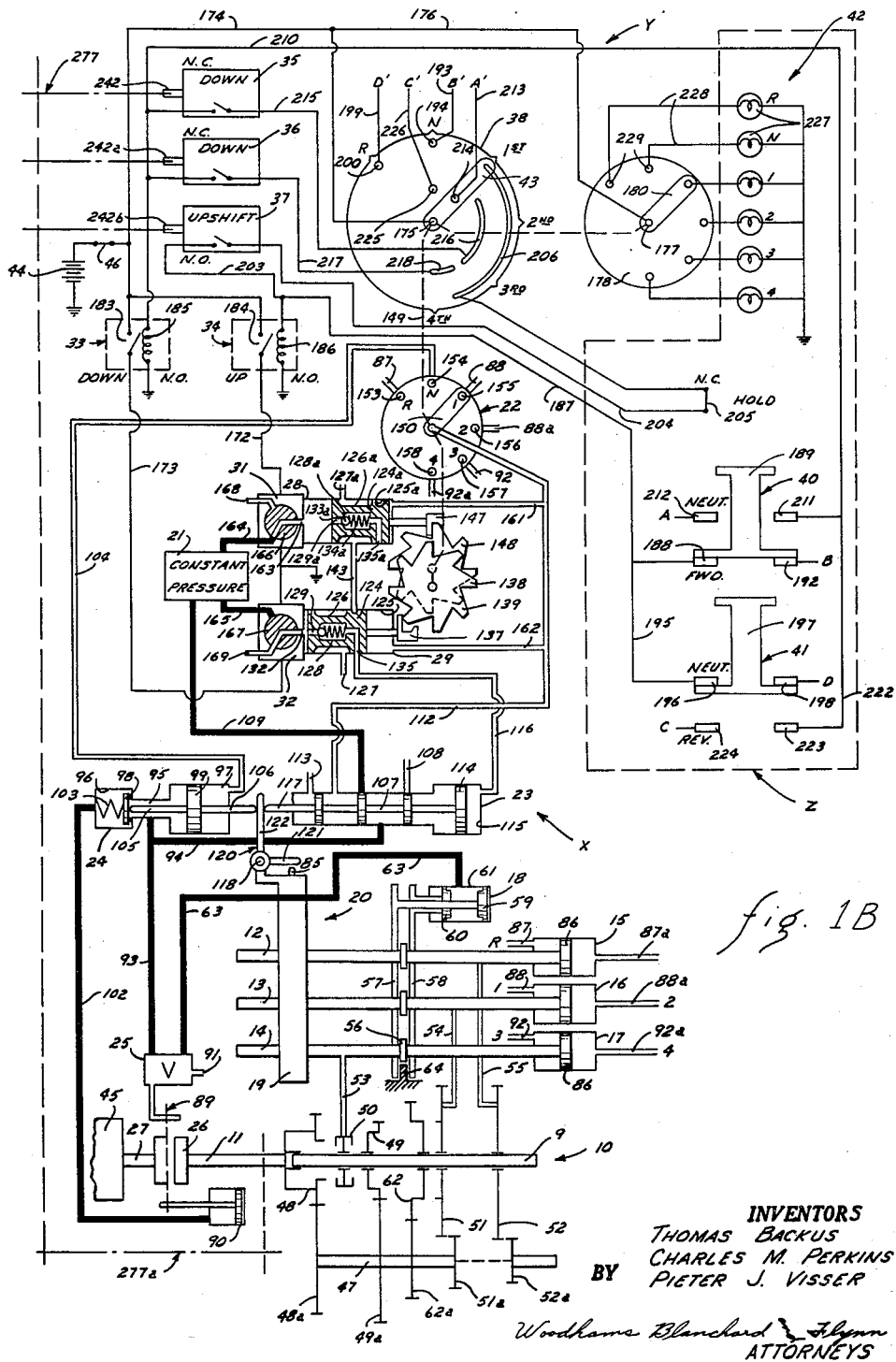

INVENTORS
THOMAS BACKUS
CHARLES M. PERKINS
PIETER J. VISSER

INVENTORS
THOMAS BACKUS
CHARLES M. PERKINS
PIETER J. VISSER
BY Woodhams Blanchard Flynn
ATTORNEYS

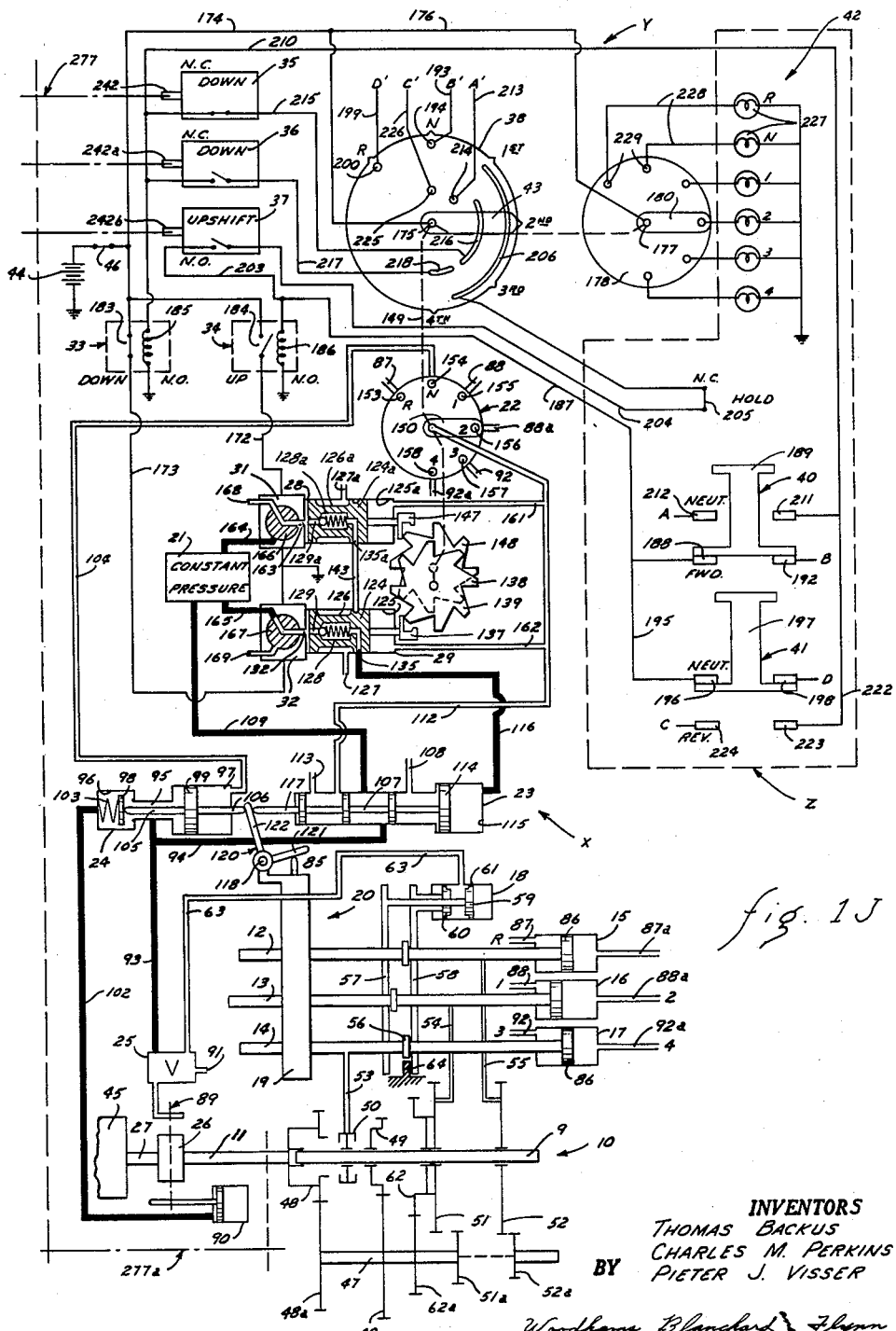

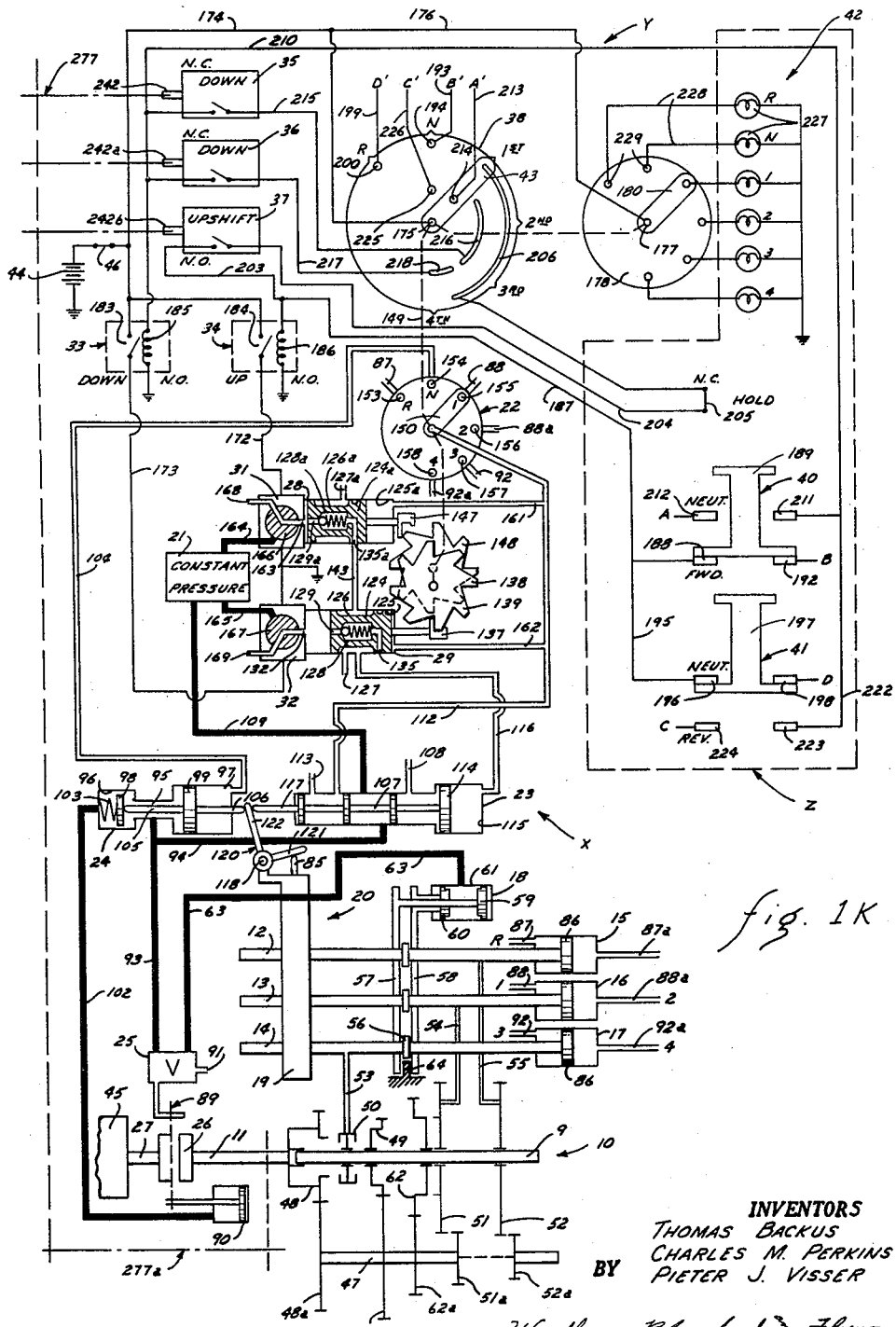

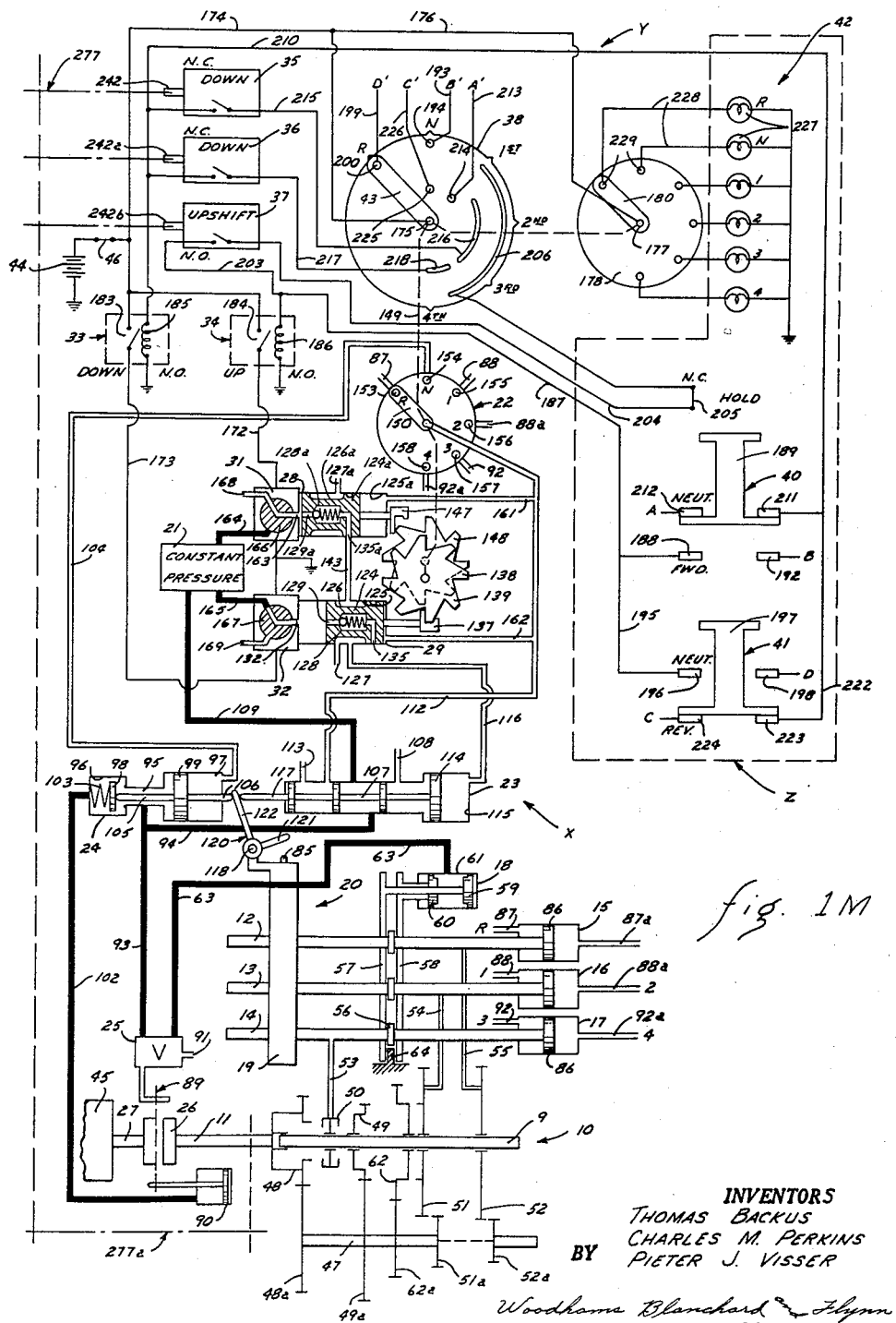

Feb. 9, 1960 T. BACKUS ET AL 2,924,111
AUTOMOTIVE DEVICE
Filed July 5, 1957 18 Sheets-Sheet 15

INVENTORS
THOMAS BACKUS
CHARLES M. PERKINS
BY PIETER J. VISSER
Woodhams Blanchard and Flynn
ATTORNEYS Feb. 9, 1960 T. BACKUS ET AL 2,924,111
AUTOMOTIVE DEVICE
Filed July 5, 1957 18 Sheets-Sheet 16

INVENTORS
THOMAS BACKUS
CHARLES M. PERKINS
BY PIETER J. VISSER
Woodhams Blanchard & Flynn
ATTORNEYS Feb. 9, 1960 T. BACKUS ET AL 2,924,111
AUTOMOTIVE DEVICE
Filed July 5, 1957 18 Sheets-Sheet 17
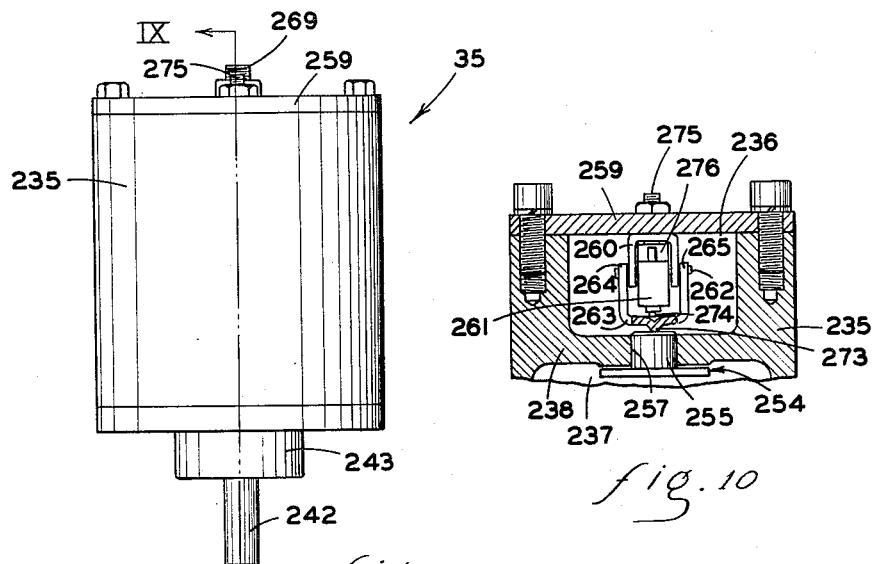
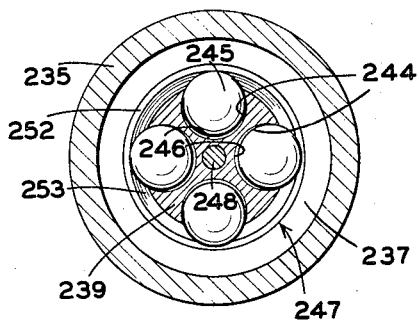
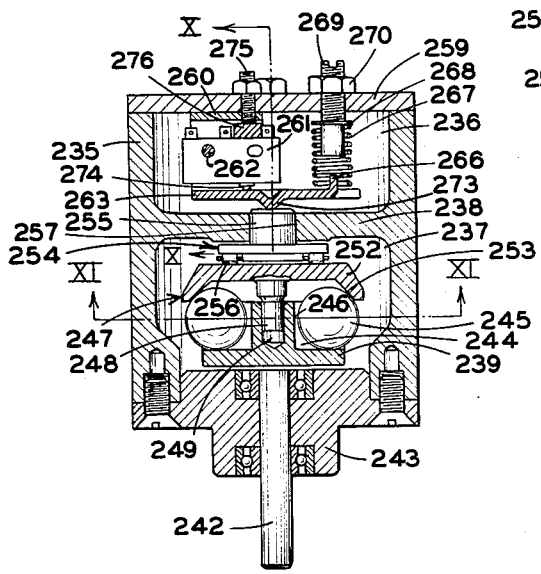
INVENTORS
THOMAS BACKUS
CHARLES M. PERKINS
BY PIETER J. VISSER
Woodhams Blanchard and Flynn
ATTORNEYS Feb. 9, 1960     T. BACKUS ET AL     2,924,111
AUTOMOTIVE DEVICE
Filed July 5, 1957     18 Sheets-Sheet 18

INVENTORS
THOMAS BACKUS
CHARLES M. PERKINS
BY PIETER J. VISSER

Woodhams Blanchard Flynn
ATTORNEYS

United States Patent Office

2,924,111
Patented Feb. 9, 1960

2,924,111

AUTOMOTIVE DEVICE

Thomas Backus, Charles M. Perkins, and Pieter J. Visser, Kalamazoo, Mich., assignors, by mesne assignments, to Fuller Manufacturing Company, a corporation of Delaware Application July 5, 1957, Serial No. 670,290

27 Claims. (Cl. 74—336.5)

This invention relates to automatic, change speed gearing and, more particularly, to an automatic shifting mechanism, which is capable of being applied to a standard transmission with only slight modification therein, said mechanism being comprised of units capable of being made in readily separable, substantially independent assemblies.

The desirability of a fully automatic transmission, for use in various types of road vehicles and other power-transmitting apparatus, has long been recognized and a great variety of devices have been designed for this purpose. In recent years some of these designs have attained commercial acceptance and a few of them are in common use. However, the majority of these automatic change gear systems, at least insofar as I am acquainted with them, are highly complex, require extensive and expensive servicing and are limited in application to transmissions especially built therefor. Thus, in spite of its many attempts, the industry has been unable to develop a completely dependable, fully automatic transmission, which can be built and maintained at a reasonably low cost, which is relatively simple in construction, and which is capable of withstanding relatively rough usage. Particularly, there has been a demand for an automatic transmission control apparatus, which is capable of application to an otherwise completely standard transmission with only minor adaptations thereof for receiving said control apparatus, and wherein the control apparatus can be easily and quickly assembled from a group of at least partially independent sub-assemblies. This latter arrangement is both economical in original fabrication and permits easy and prompt replacement of malfunctioning sub-assemblies or units in a given vehicle in order to restore the vehicle to its operating condition in a minimum of time and with a minimum of cost. Thus, the ailing part can be removed and replaced without preventing continued operation of the vehicle within which such part was used, and such part can then be repaired at a suitable repair center by technicians properly qualified for the purpose and having access to proper tools.

Accordingly, the objects of the invention have been:

(1) To provide a fully automatic change gear control mechanism applicable, with only minor adapting modifications, to an otherwise completely standard, hand-shifted transmission.

(2) To devise a fully automatic change speed gear control mechanism, which will be fully reliable in operation.

(3) To provide an automatic control mechanism, as aforesaid, which is readily and conveniently separable into independent units, which units may be economically fabricated as sub-assemblies, and with which the vehicle containing a malfunctioning control unit can be readily restored to operating condition by merely removing the malfunctioning unit and replacing it with a similar, satisfactory unit. The malfunctioning unit can then be repaired when, and as, convenient.

(4) To provide an automatic control mechanism, as aforesaid, which can be both built and maintained at low cost.

(5) To devise an automatic control mechanism, as aforesaid, which can be readily applied to different specific types of transmissions, with only minor adapting modifications required for either the transmission concerned or the controlling mechanism.

(6) To devise a control mechanism, as aforesaid, for effecting fully automatic change gear shifting, while accurately controlling the clutch mechanism in association with the gear shifting to effect a smooth and effective shift in a minimum of time.

(7) To provide a control mechanism, as aforesaid, which can be readily adapted for actuation by compressed air, by oil under pressure or other pressure fluid.

(8) To provide a control mechanism, as aforesaid, having push button, manual controls for selecting neutral, forward and reverse conditions of operation of the apparatus.

(9) To provide an automatic control mechanism, as aforesaid, adapted for manufacture in independent components of relatively simple construction and, particularly, wherein the necessary pressure fluid passageways can be provided in a relatively few, as two, easily made core plates.

(10) To provide a control mechanism, as aforesaid, wherein an upshift or downshift within the forward gear range is dependent, at least in part, upon the speed of the transmission input shaft, whereby the engine connected to said input shaft can be continuously operated within its high horsepower range, hence more efficiently.

(11) To provide a control mechanism, as aforesaid, wherein either or both of the upshift function or the downshift function as desired by the manufacturer, usually the upshift function but not the downshift, can be manually inactivated if and when desired by the operator.

Other objects and purposes of this invention will become apparent to persons familiar with this type of equipment upon reading the following specification and examining the accompanying drawings, in which.

Figure 1:
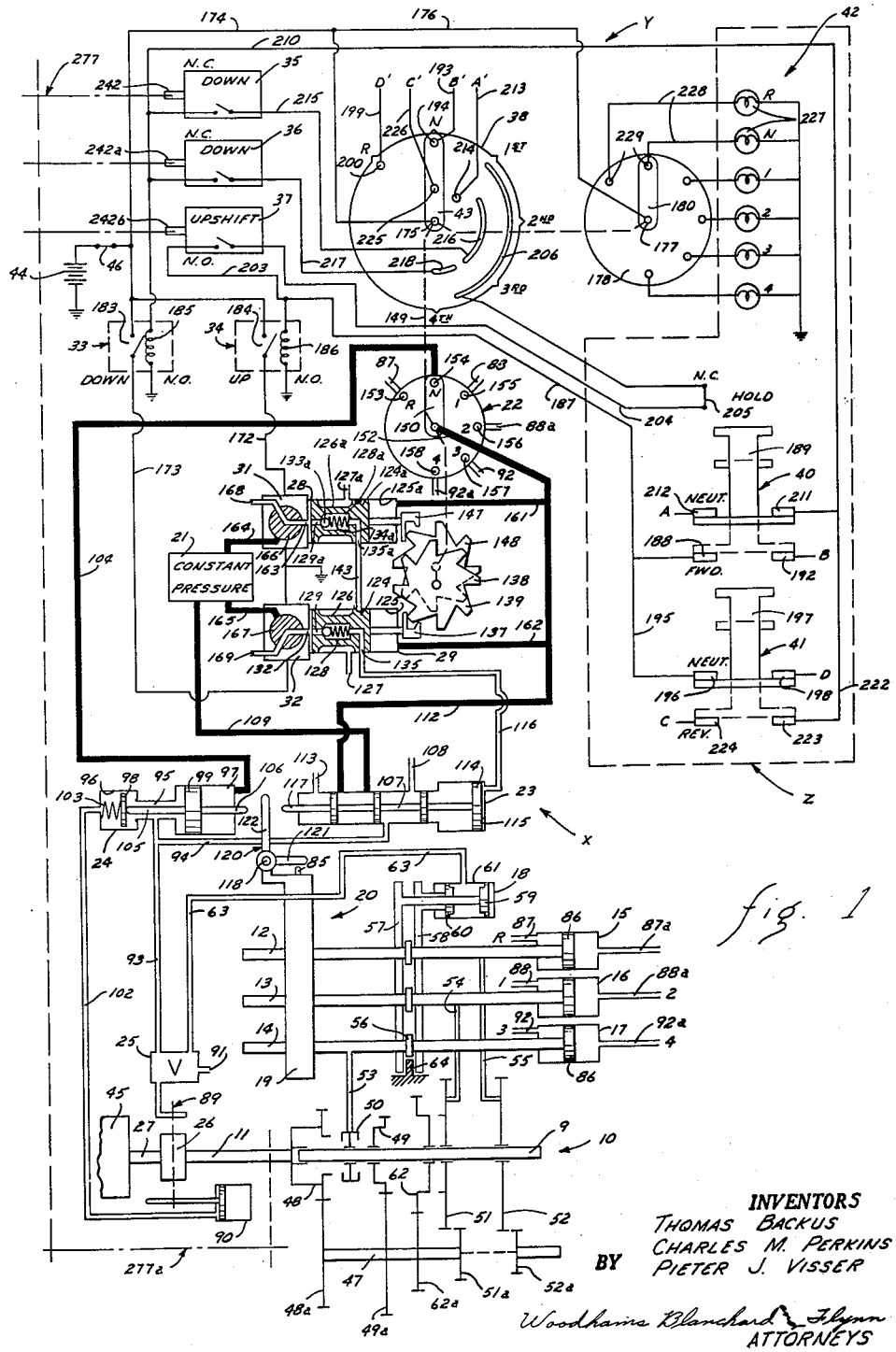
Figure 1 is a partially schematic and partially diagrammatic view of a fully automatic transmission embodying the invention, including a control mechanism therefor, shown in neutral position.
Figure 1A:
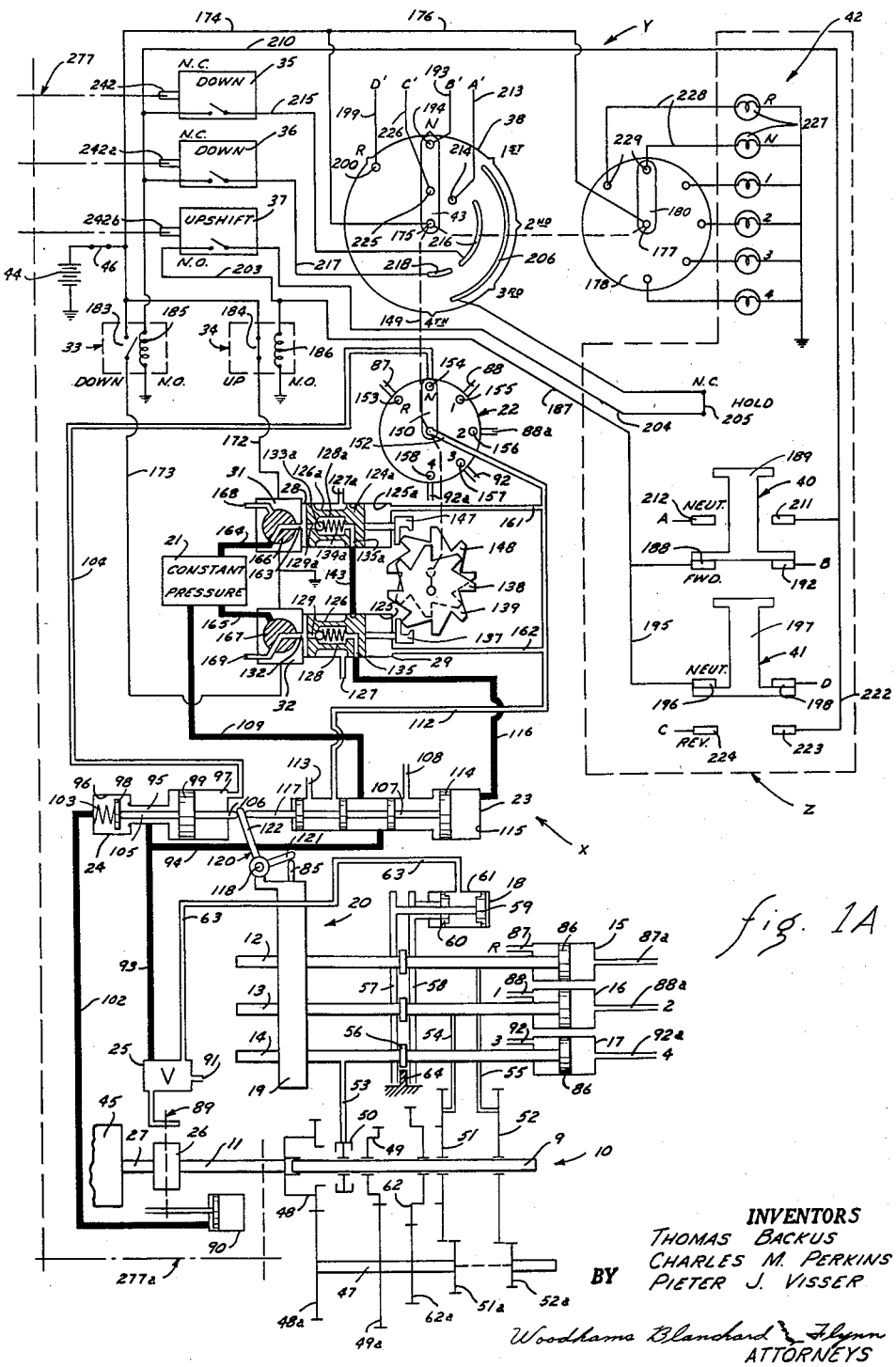
Figure 1A shows the apparatus of Figure 1 just after the control mechanism has been actuated for the purpose of shifting the transmission from neutral to first gear.

Figure 1B discloses the condition of the apparatus of Figure 1 during the shift from neutral into first gear and following its Figure 1A condition.

Figure 1C:
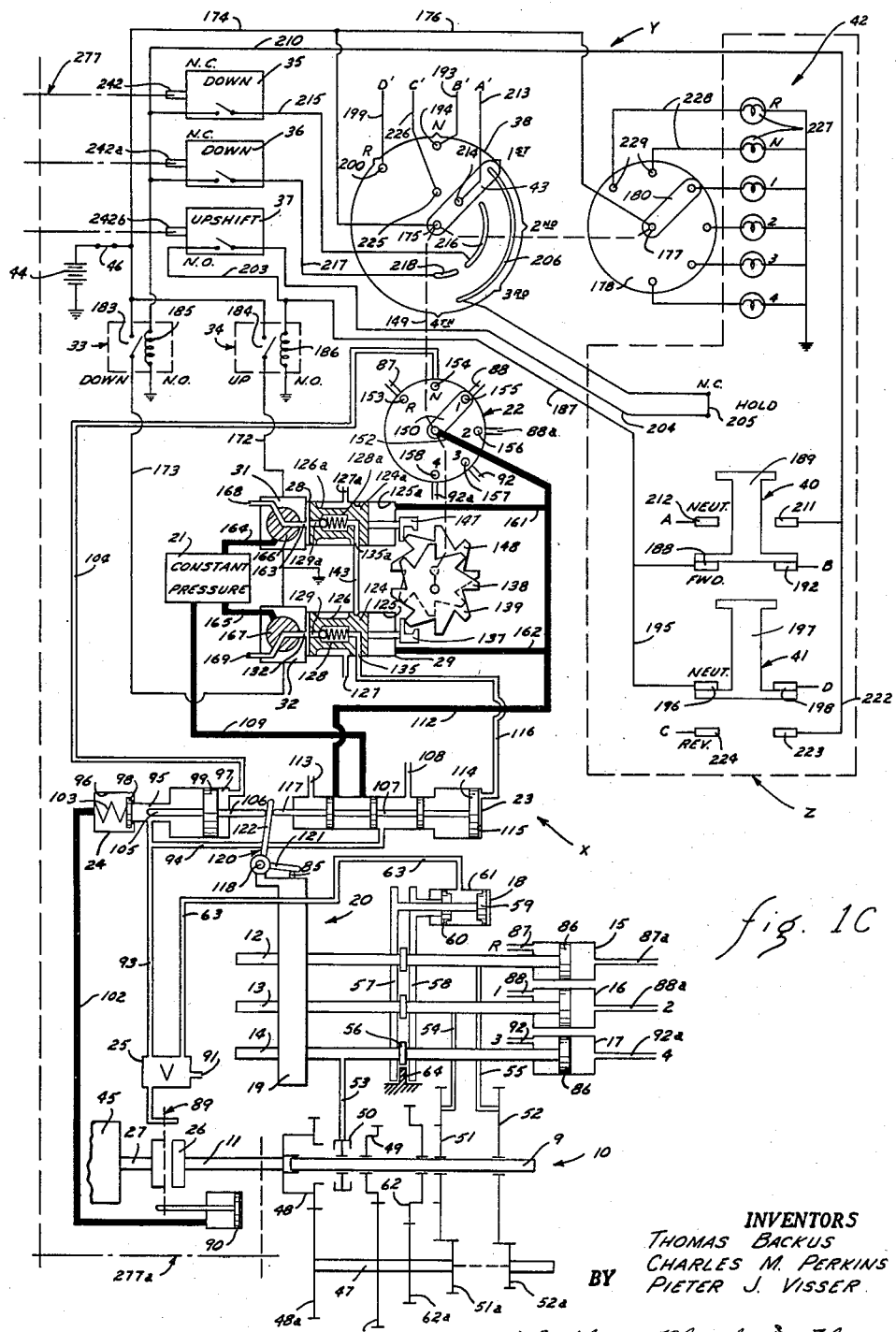

Figure 1C shows the condition of the apparatus of Figure 1 following its Figure 1B condition and just before said control mechanism effects a shift of the transmission.

Figure 1D:
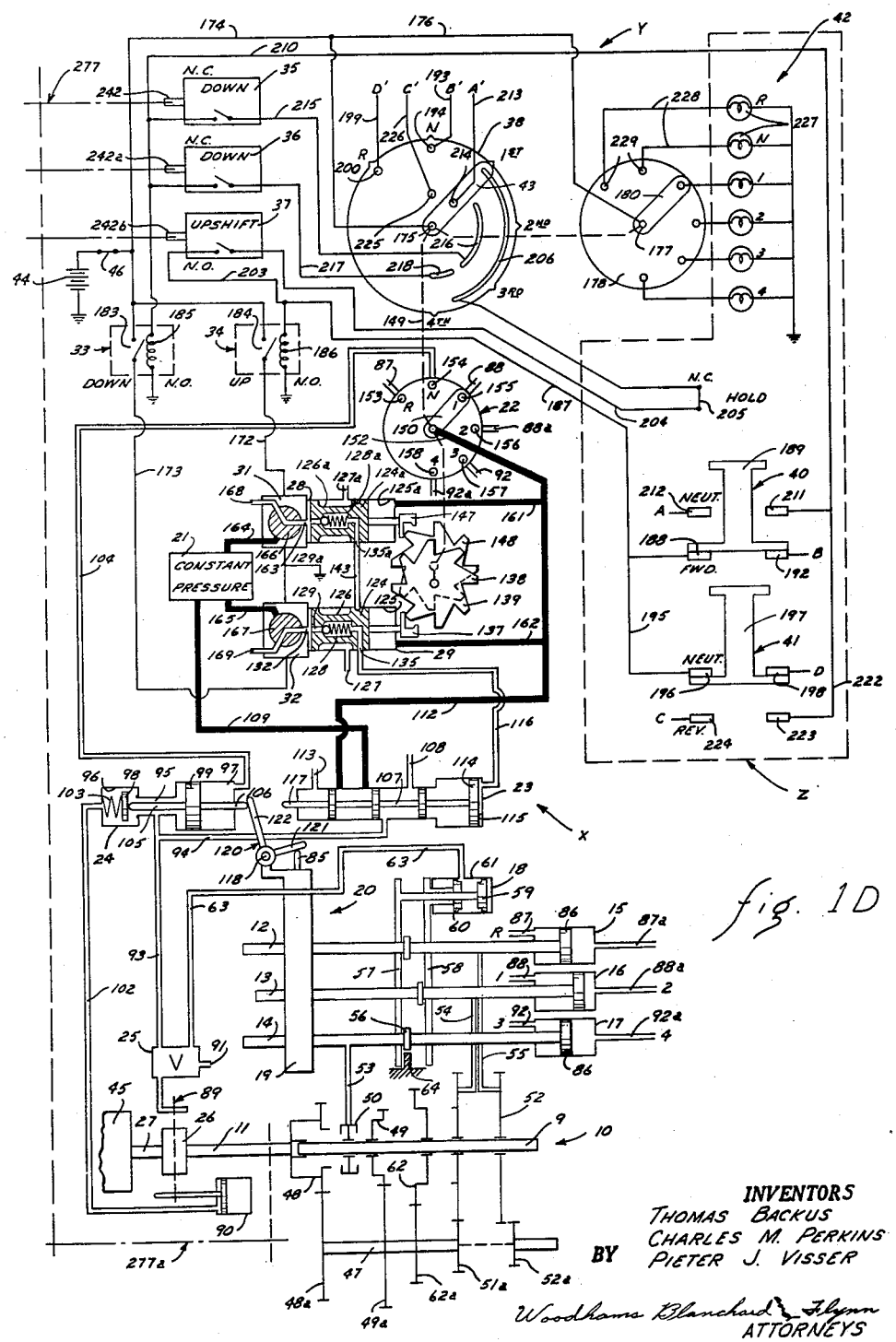

Figure 1D discloses the transmission after it is completely shifted into first gear.

Figure 1E:
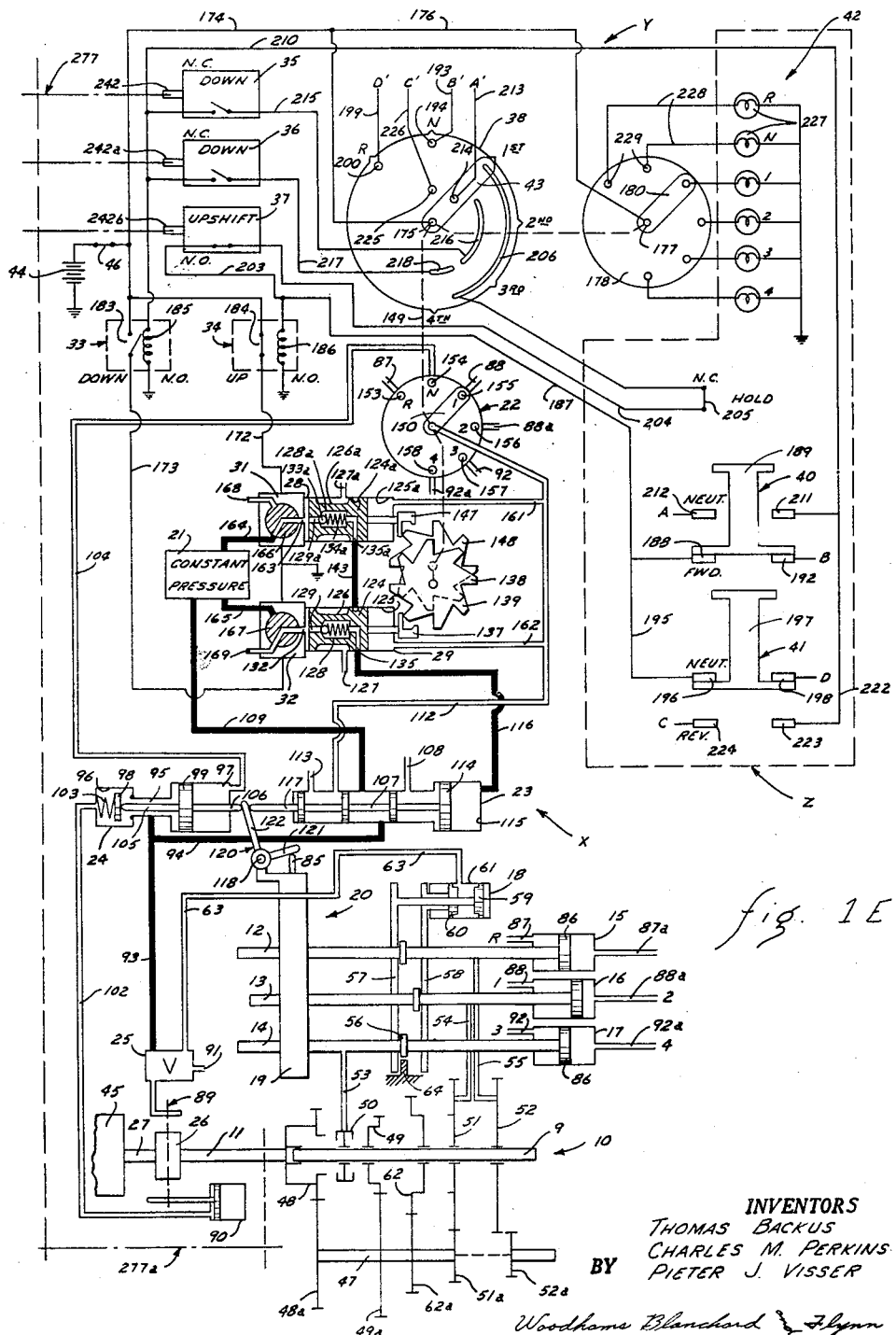

Figure 1E illustrates the condition of the apparatus of Figure 1 just after the control mechanism thereof is actuated to effect a shift from first to second gear.

Figure 1F:
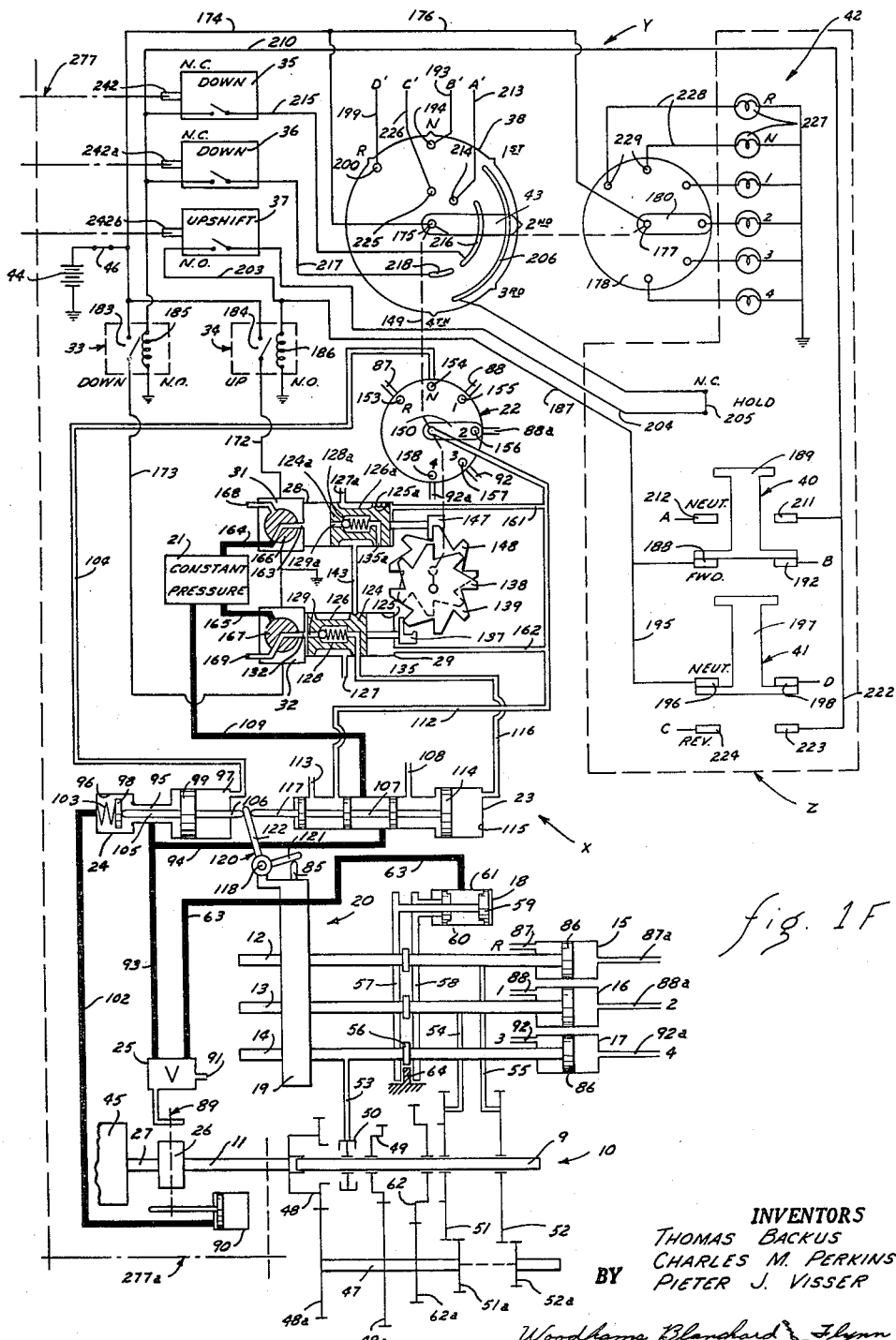

Figure 1F shows the apparatus of Figure 1 during the shift from the first gear position to the second gear position, and with the transmission in neutral.

Figure 1G:
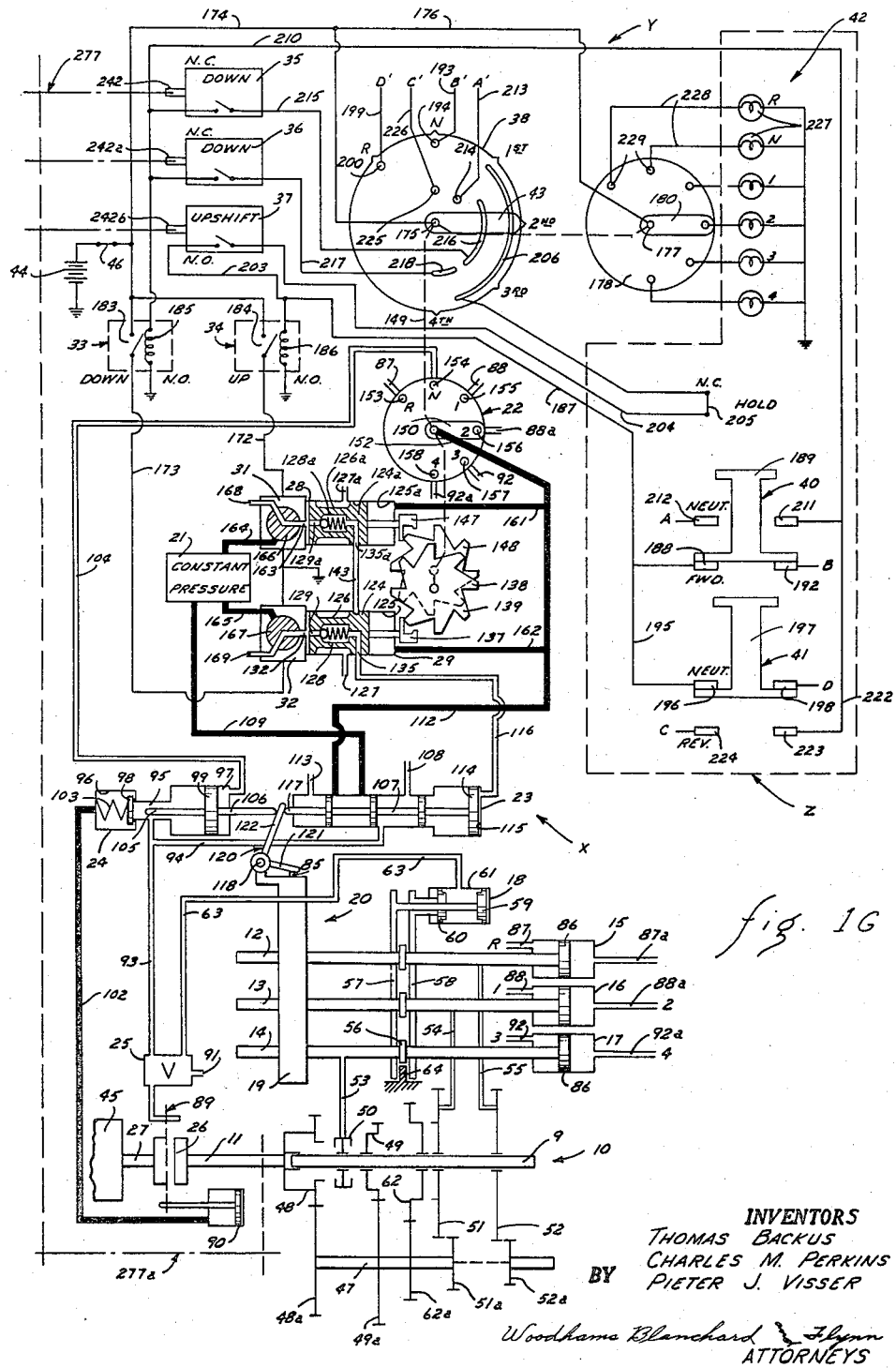

Figure 1G shows the apparatus of Figure 1 just before the transmission is shifted from neutral into second gear position.

Figure 1H:
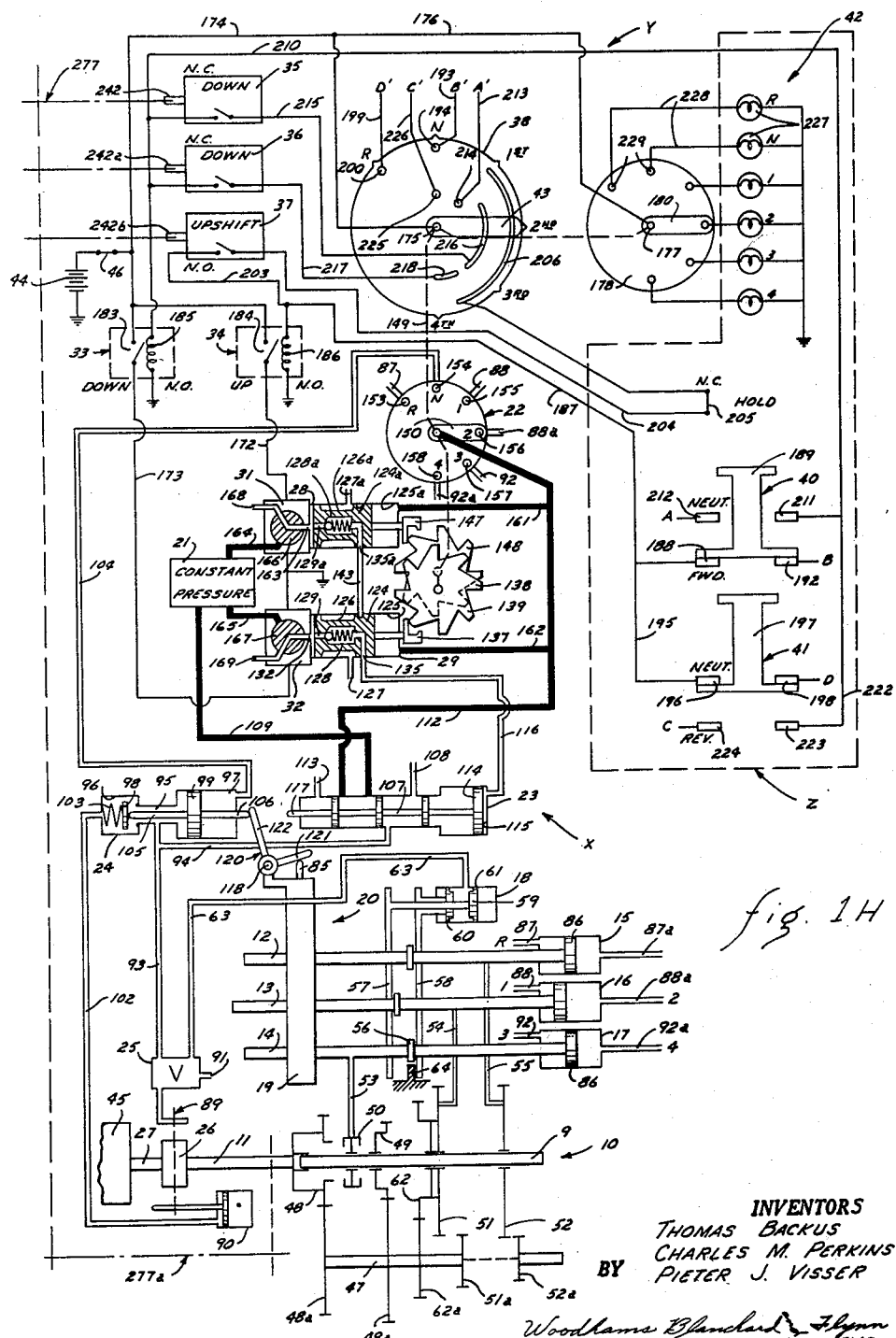

Figure 1H illustrates said apparatus of Figure 1 in the second gear position.

Figure 1J shows the automatic transmission of Figure 1 in the second gear position and just after the control mechanism thereof has been actuated for a downshift to first gear position.

Figure 1K shows the apparatus of Figure 1 after the control mechanism thereof has downshifted into first gear and the transmission is in neutral.

Figure 1L:
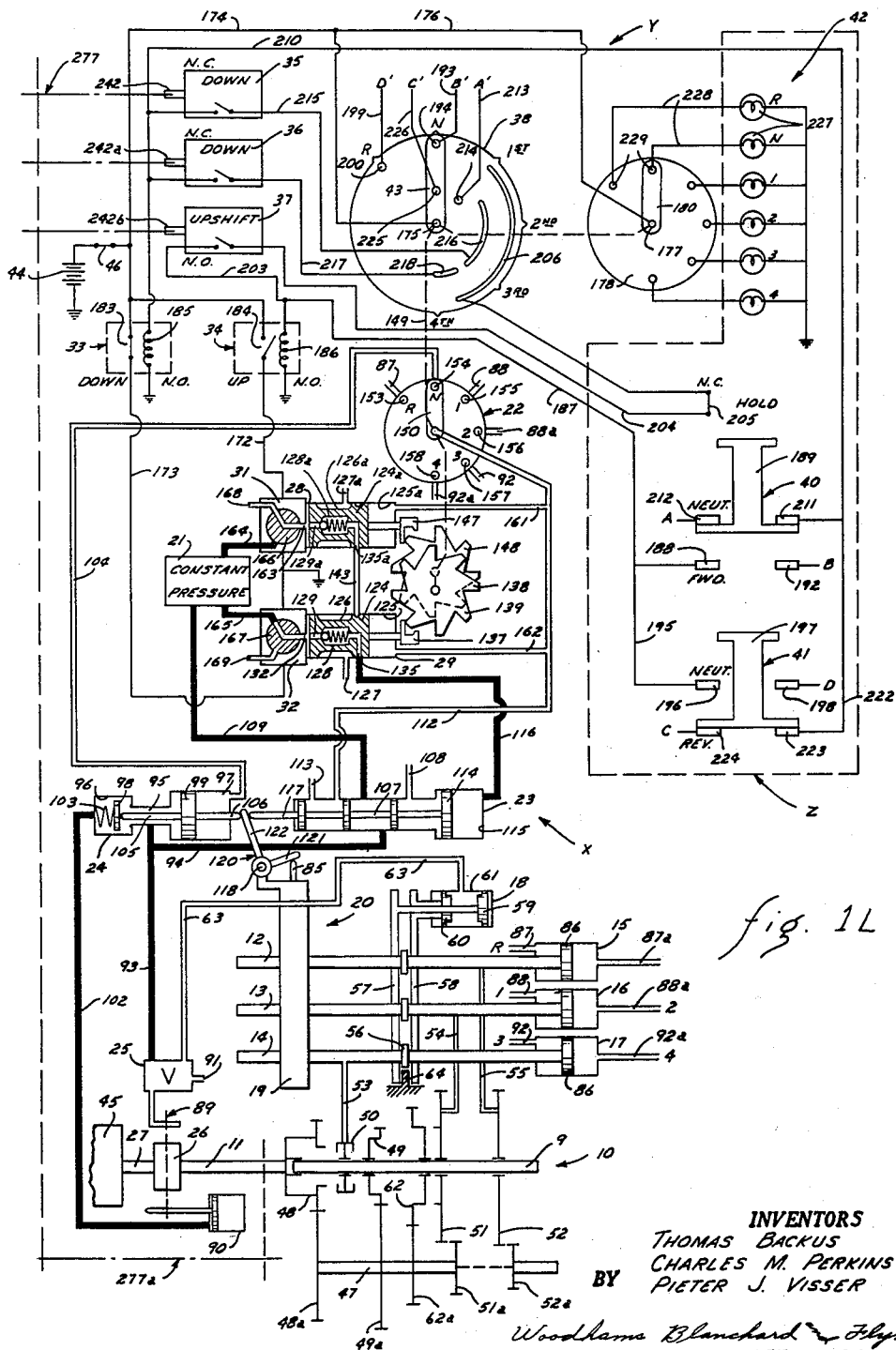

Figure 1L shows the apparatus of Figure 1 just after the control mechanism thereof has been actuated for a shift into reverse gear.

Figure 1M shows the apparatus of Figure 1 with the control mechanism in the reverse position and the transmission in neutral.

Figure 1N:
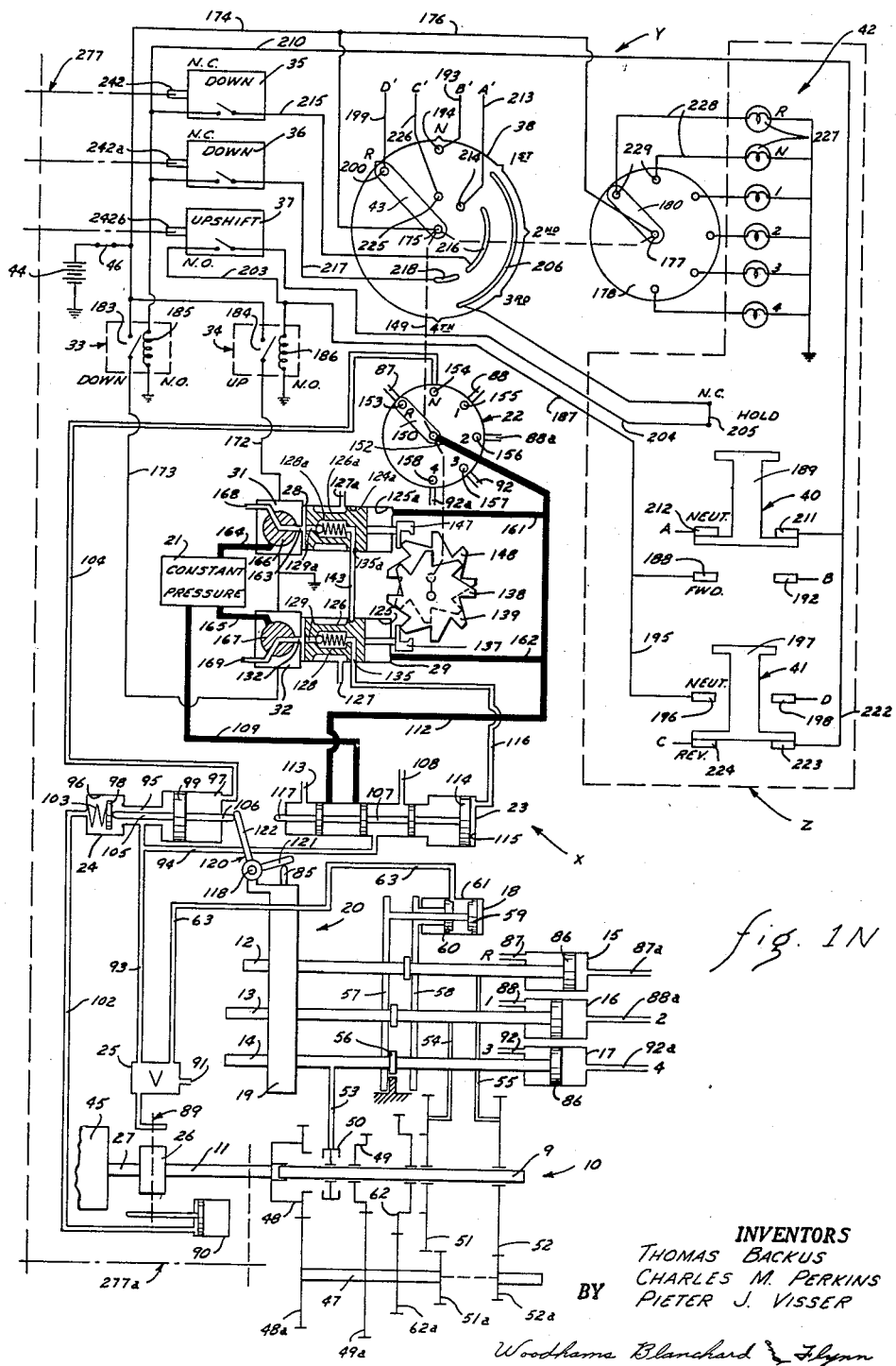

Figure 1N shows said fully automatic transmission shifted into reverse gear.

Figure 2:
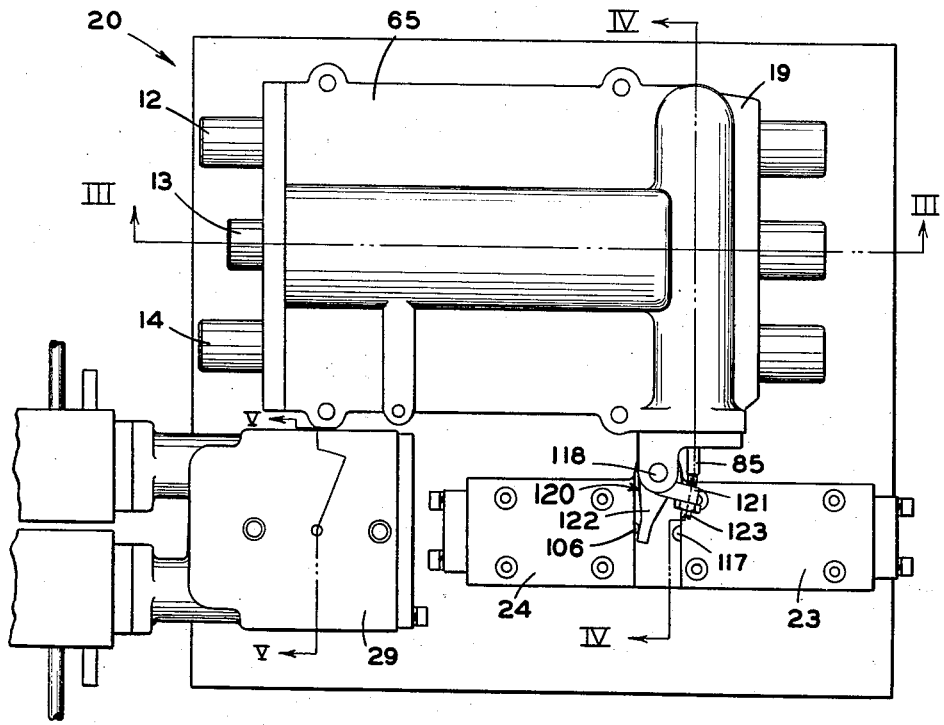

Figure 2 is a top plan view of a structure embodying the invention.

Figure 3:
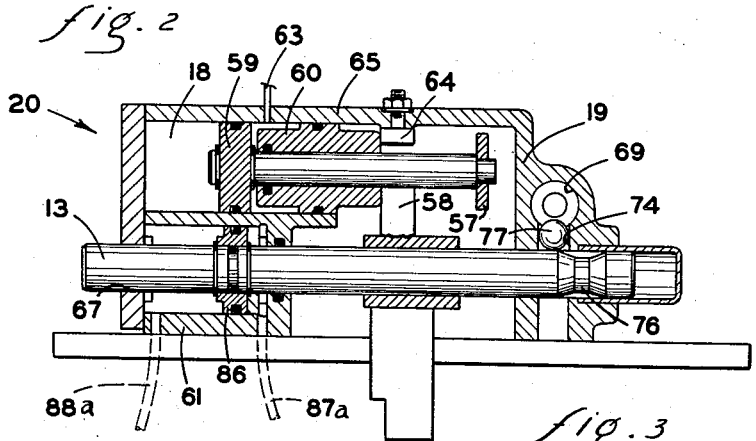

Figure 3 is a sectional view, substantially as taken along the line III—III of Figure 2.

Figure 4:
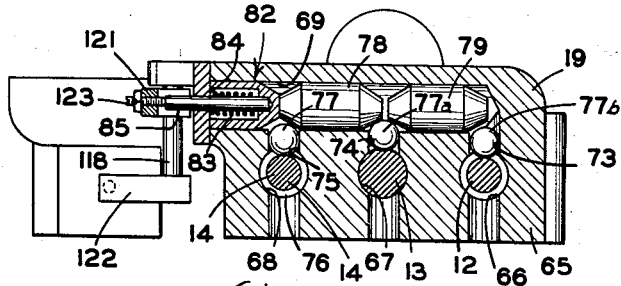

Figure 4 is a sectional view taken along the line IV—IV of Figure 2 and rotated 90° clockwise.

Figure 5:
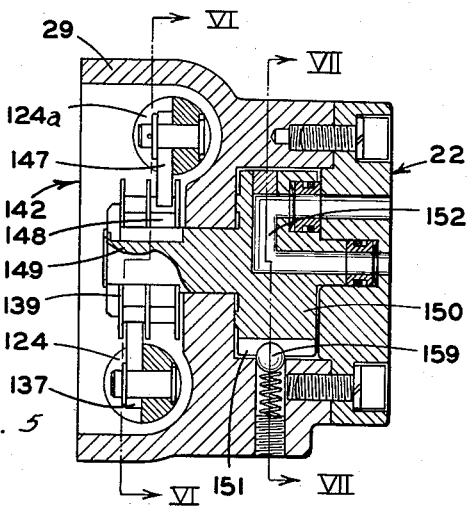

Figure 5 is a sectional view, substantially as taken along the line V—V of Figure 2.

Figure 6:
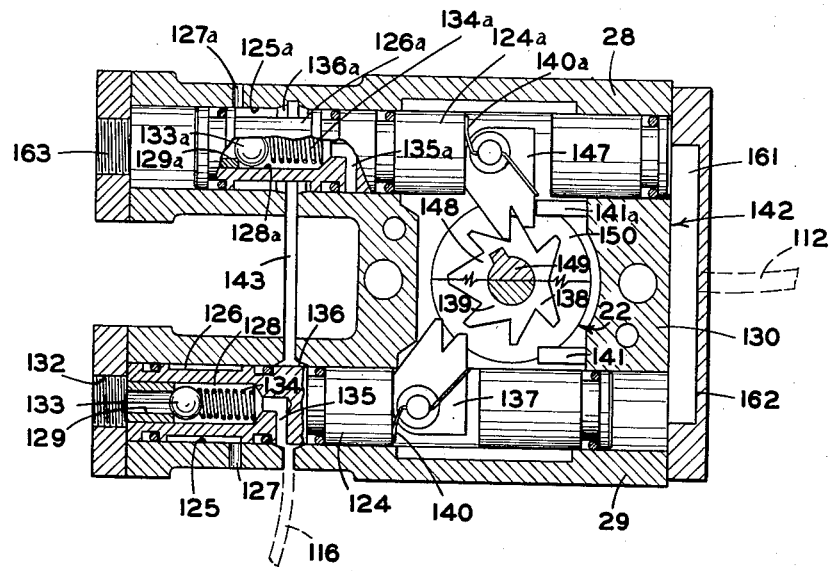

Figure 6 is a sectional view, substantially as taken along the line VI—VI of Figure 5.

Figure 7:
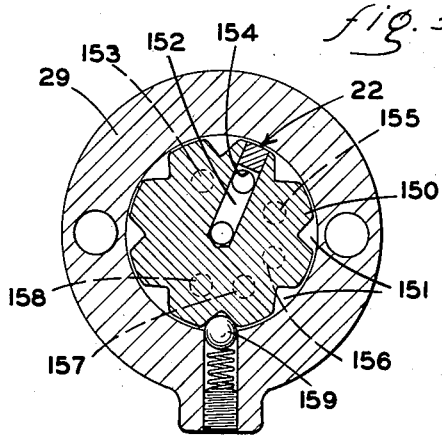

Figure 7 is a sectional view taken along the line VII—VII of Figure 5.

Figure 8 is a side elevational view of a speed sensitive switch.

Figure 9 is a sectional view taken along the line IX—IX of Figure 8.

Figure 10 is a sectional view taken along the line X—X of Figure 9.

Figure 11 is a sectional view taken along the line XI—XI of Figure 9.

Figures 12, 13:
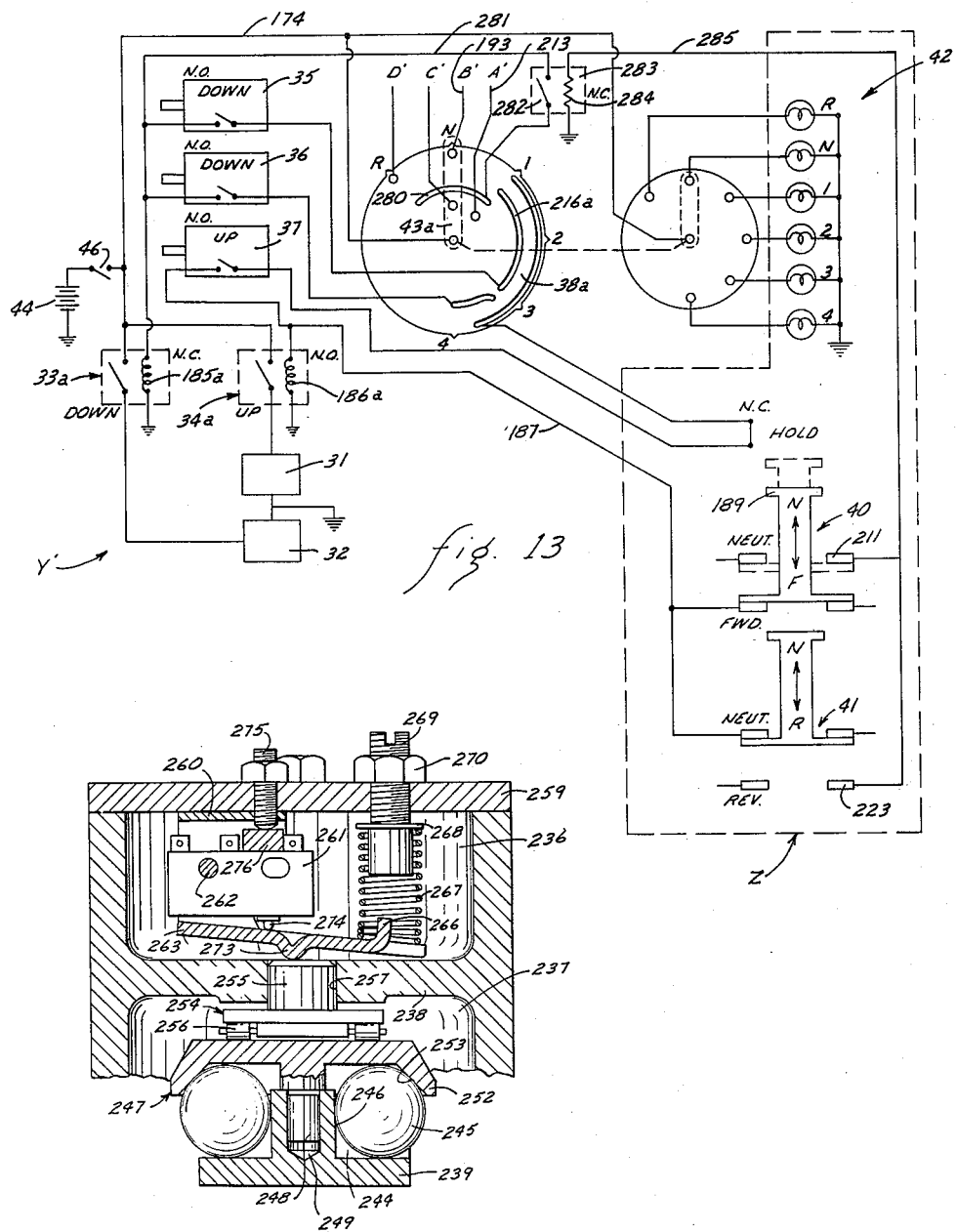

Figure 12 is a fragment of Figure 9 in a different operating position.

Figure 13 is a fragment of Figure 1, showing a modification of the electrical system thereof.

For the purpose of convenience in description, the terms "upper," "lower," and derivatives thereof, will have reference to the structure in its normal position of operation. The terms "inner," "outer," and derivatives thereof, will have reference to the geometric center of said structure. The terms "leftward," "rightward," and derivatives thereof, will be used in referring to parts of the transmission and its control mechanism and will refer to the parts as they appear in Figure 1. The terms "clockwise" and "counterclockwise" may be used in referring to rotational movements of certain rotatable parts in said control mechanism, as viewed in Figure 1.

While an application of the invention to a road vehicle, as a truck, is hereinafter used to illustrate the invention, it will be appreciated that such use is illustrative only and not limiting. The invention is applicable to a wide range of change gear uses and is particularly applicable also to passenger cars and to dirt moving equipment.

GENERAL DESCRIPTION

In order to meet the objects and purposes of this invention set forth above, as well as others related thereto, a control mechanism has been provided whereby the shiftable elements of a substantially conventional transmission, such as the truck transmission shown in Figure 1, will be automatically energized simply by operating one of two manual switches, which switches merely select forward or reverse connections between the transmission input and output shafts. The proper ratio is then automatically selected in response to the rotational speed of the input shaft of said transmission.

The transmission 10 (Figure 1) is provided with a main (or output) shaft 9, an input shaft 11 and shift rods 12, 13, and 14, said rods being operated by pressure actuated, shift cylinders 15, 16 and 17, respectively. The said shiftable elements in the transmission 10 are shifted by said rods in a manner which may be substantially similar to that set forth in United States Patent No. 2,637,221, which is assigned to the assignee of this application. A neutral cylinder 18, and means operable thereby, are provided for moving the shift rods 12, 13 and 14 into their neutral positions. A shift lock mechanism 19 prevents more than one of said shift rods from being out of neutral position at the same time. The shift cylinders 15, 16 and 17 are connected to a source 21 of pressure fluid, such as compressed air, through a fluid control system "X," including a flow selector valve 22, director valve 23 and a clutch control valve 24, which latter is connected to a clutch operating pressure responsive cylinder 90. The director valve 23 is connected to the neutral cylinder 18 through a neutral control valve 25, which is opened upon full disengagement of the clutch 26 and closed by reengaging said clutch. The selector valve 22 is operated by mechanism, including the power cylinders 28 and 29, which are connected to said fluid source 21 through the solenoid valves 31 and 32, respectively. The director valve 23 functions to direct pressure fluid from the source 21 either to a primary portion of the fluid control system "X," comprising the shift cylinders, the selector valve 22 and fluid handling parts associated therewith, or to a secondary portion of the fluid control system comprising the clutch valve 24, the clutch cylinder 90, the neutral control valve 25, the neutral cylinder 18 and fluid handling parts associated therewith.

The solenoid valves 31 and 32 are electrically connected to relays 34 and 33, respectively, which comprise part of the electrical system "Y," including the speed sensitive switches 35, 36, and 37, the automatic selector switch 38 and the manually operable, drive direction switches 40 and 41. The selector switch 38 is mechanically coupled with the flow selector valve 22. The electrical system "Y" is connected through the ignition switch 46 to a source of electrical energy, such as the battery 44, and may include also a visual indicator 42.

In general, the electrical system "Y" determines the direction in which the main shaft 9 of the transmission 10 will be rotated by the engine 45. Where, as is normal, said transmission has several gear ratios in the forward direction of drive, said electrical system also determines and selects, automatically, the proper gear ratio in which the transmission 10 should be shifted for any particular condition of operation. The fluid control system "X" provides the power and mechanism whereby the shifting of said transmission 10 is actually effected in response to directions from the electrical system "Y." The visual indicator 42 and the directional switches 40 and 41 are preferably part of a remote control system or panel, indicated by broken lines at "Z."

DETAILED CONSTRUCTION

A. Transmission

As diagrammatically shown in Figure 1, the transmission 10 may be of a substantially conventional type having a plurality of shiftable elements, which are axially slidably supported upon the main shaft 9. Said shiftable elements include the shiftable member 50 and the shiftable gears 51 and 52, all of which are axially slidably mounted upon said shaft 9 for rotation therewith. The shiftable member 50 is connected to the shift rod 14 by the yoke 53. When said member 50 is moved leftwardly (Figure 1), it engages the gear 48 on the input shaft 11, thereby directly connecting said input shaft to the main shaft. When said member 50 is moved rightwardly it engages the gear 49, which is meshed with the gear 49a secured upon the countershaft 47.

The shiftable gears 51 and 52 are connected to the shift rods 13 and 12, respectively, by the yokes 54 and 55. Leftward movement of the gear 51 causes it to engage gear 62 which is meshed with the gear 62a secured upon the countershaft 47. Rightward movement of the gear 51 causes it to mesh with the gear 51a on the shaft 47. Rightward movement of the shiftable element 52 causes it to mesh with the reverse gear 52a.

The shift rods 12, 13 and 14 (Figures 1, 2 and 3) each have a shift locator 56 mounted thereon in similar positions with respect thereto and between the ends thereof. Said shift locators are engageable by, and disposed between, neutralizing members 57 and 58, which are secured, respectively, to the pistons 59 and 60 within the cylinder housing 61 of the neutral cylinder 18. A pressure fluid conduit 63 communicates with the interior of the pressure cylinder 18 (Figures 1 and 3) between the pistons 59 and 60 whereby the flow of pressure fluid into the neutral cylinder 18 will cause said neutralizing members 57 and 58 to be moved toward each other and thereby align the shift locators 56, hence their corresponding shift rods 12, 13 and 14, in the neutral position. A guide stop 64 is provided for engagement by the neutralizing members 57 and 58 when they are in a position holding said shift rods in neutral.

The shift lock 19 (Figures 3 and 4) is comprised of a shift lock housing 65, having three parallel and horizontal openings 66, 67 and 68, through which the shift rods 12, 13 and 14, respectively, are slidably received. Said shift lock housing 65 also has an elongated, cylindrical lock bar opening 69 (Figures 3 and 4), which is disposed transversely of, and is spaced substantially equidistantly above, the rod openings 66, 67 and 68. Said lock bar opening 69 is connected to the rod openings 66, 67 and 68 by three lock ball openings 73, 74 and 75, respectively. The shift rods 12, 13 and 14 are each provided with an annular groove 76 (Figure 3), which has tapered, axial end walls, and which is aligned with said lock ball opening when its corresponding shift rod is in the neutral position. Lock balls 77, 77a and 77b which are receivable into the annular grooves 76, are disposed within the lock ball openings so that they will also extend at all times into the lock bar opening 69. A pair of cylindrical lock bar segments 78 and 79 are slidably and snugly disposed within the lock bar opening 69, one such bar segment being disposed between each adjacent pair of lock ball openings 73, 74 and 75. The lock bar segments 78 and 79 are provided with conically shaped ends, which are engageable with the lock balls 77, 77a and 77b. The length of the lock bar segments 78 and 79 is such that they will permit only one of the lock balls 77 at a time to move upwardly, into the lock bar opening 69 and out of its annular groove 76. Thus, the lock bar segments 78 and 79 thereby permit only one of the said shift rods 12, 13 and 14 at a time to move out of its neutral position. It will be recognized that other types of shift lock mechanisms, such as that shown in United States Patent No. 2,775,901, may be utilized to accomplish this same result.

A cylindrical lock bar end segment 82, which has one conical end, is also snugly and slidably disposed within the lock bar opening 69 with its conical end adjacent to the lock bar segment 78 and engageable therewith. Said end segment 82 is continuously and resiliently urged toward the lock bar segment 78 by a spiral spring 83, which is held under compression between said end segment 82 and the adjacent end wall 84 of the lock bar opening 69. Accordingly, when the shift rods 12, 13 and 14 are all in the neutral position, the lock balls 77, 77a and 77b (Figure 4) will all be urged into the annular grooves 76 on their respective shift rods by the lock bar segments 78, 79 aud 82, due to the urging of the spiral spring 83. An actuating pin 85 is coaxially secured to the lock bar end segment 82 and extends therefrom through the spring 83 and the end wall 84, for reasons appearing hereinafter.

As shown in Figure 1, each of said shift rods 12, 13 and 14 is provided with a piston 86, which is disposed within its corresponding shift cylinders 15, 16 and 17. The shift cylinders 15, 16 and 17 are each provided with a pair of conduits 87 and 87a, 88 and 88a, and 92 and 92a, respectively, which communicate with the interior of said shift cylinders on the opposite sides of their corresponding pistons 86.

B. Shift control mechanism in general

Before proceeding with a detailed description of the various parts of the shift control mechanism (Figure 1), which includes the control systems "X," "Y" and "Z," a brief description will be given of their principal components, as follows:

The drive direction switches 40 and 41 have manually operable armatures 189 and 197, respectively, and are each adapted to connect selected pairs of contacts. Each switch remains in whatever position it is manually placed.

The relays 33 and 34 are of any conventional, electro-responsive, normally open type.

The selector switch 38 has an armature 43 continuously connectible at its center to a source of potential and selectively connectible to a plurality of contacts or taps. Tap strips on said selector switch, which are also engageable by said armature 43, are connected through the governor, or speed responsive, switches 35 and 36 to the relay 33, and through the governor switch 37 to the relay 34.

The governor switches 35, 36 and 37 are mechanically connected to the input shaft 11 of the transmission 10, the switches 35 and 36 being normally closed and the switch 37 being normally open.

The solenoid valves 31 and 32, which are operably connected to the relays 34 and 33, respectively, are arranged for connecting a source of pressure fluid to the power cylinders 28 and 29, respectively.

The power cylinders 28 and 29 have pistons 124a and 124, respectively, which are engageable with the ratchet wheels 148 and 139, respectively. Said ratchet wheels are secured upon the same shaft 149 and are rotated in opposite directions by the pistons 124 and 124a. The shaft 149 is connected to the rotary core 150 of the selector valve 22. Thus, operation of the solenoid 32 by the relay 33 causes the piston 124 to engage the ratchet wheel 139 and rotate the core 150 in one direction. Operation of the solenoid 31 by relay 34 causes the piston 124a to effect a counter-rotation of the core 150.

The director valve 23 has a piston 114 which is operable by fluid pressure in the line 116 for moving the core 107 from a rightward position in which it connects the source 21 to the conduit 112 to a leftward position in which it connects said source 21 to the conduit 94.

The clutch control valve 24 has a core 98 operable, by each of three means: by the piston 99 in the chamber 97 in response to fluid pressure from the conduit 104 applied to the rightward side of said piston; by fluid pressure from the conduit 94 applied to the rightward side of said core; and by contact of the lever 122 against the end 106.

The declutching cylinder 90 has a piston which, when operated, causes the linkage 89 both to disengage the clutch 26 and operate the neutral control valve 25, thereby connecting the conduit 93 to conduit 63.

C. Fluid control system

Commencing with the fluid control system "X," the automatic shift control mechanism will now be described in detail. Such description will, for purposes of orientation, start with the neutral control cylinder, which is one link between said fluid control system and said transmission. Other links between the transmission 10 and fluid control system "X" are the declutching cylinder 90 and the shift cylinders 15, 16 and 17. The description will then proceed to the solenoid valves 31 and 32, which comprise the link between the fluid control system "X" and the electrical control system "Y."

The neutral cylinder 18 (Figure 1) is connected by the conduit 63 to the neutral control valve 25, which is operable by the linkage 89 connected to the clutch 26 and the declutching cylinder 90. The neutral control valve 25, which has an exhaust port 91, is arranged to connect the conduit 93 to the conduit 63, only when the clutch 26 is fully disengaged by appropriate operation of the declutching cylinder 90. The neutral control valve 25 is connected by the conduit 93 to the clutch control valve 24, and said conduit 93 is connected by the conduit 94 to the director valve 23. The conduit 93 communicates with the passageway 95 in the clutch control valve 24 between the valve chamber 96 and piston chamber 97, which contain the valve head 98 and the piston 99, respectively. A conduit 102 communicates between the declutching cylinder 90 and that end of the valve chamber 96 remote from the passageway 95. The declutching cylinder 90 is so arranged with the linkage 89 that fluid entering said declutching cylinder 90 from the conduit 102 will effect a disengagement of the clutch 26. The valve head 98 is urged by a resilient means, such as the spiral spring 103, into a position closing the passageway 95 where it enters the valve chamber 96.

A conduit 104 communicates between the neutral position of the flow selector valve 22 and that end of the valve chamber 97 on the opposite side of the piston 99 from the passageway 95. The piston 99 has an integral rod 105 which extends with clearance through the passageway 95 and holds the valve head 98 away from the passageway 95 when the piston 99 is urged leftwardly into a position adjacent to said passageway 95. Said piston 99 also has an integral rod 106 which is substantially parallel with the rod 105 and extends in the opposite direction from the piston 99 out through the end wall of the valve chamber 97 for reasons appearing hereinafter.

The director valve 23 (Figure 1) has an axially reciprocable valve core 107 which is movable from a position connecting the conduit 94 to an exhaust port 108, to a position connecting said conduit 94 to a pressure into conduit 109, which is connected to the constant source 21 of pressure fluid. Said source 21 may be a conventional pump which is operated by the engine 45. For illustrative purposes, said source may be assumed to supply compressed air, but it will be recognized that other pressure fluids may be used. Further, if a vacuum system is used, then the high pressure source 21 becomes the atmosphere. When said conduit 94 is connected through the valve 23 to the exhaust port 108, said pressure inlet conduit 109 is connected through the valve 23 to a pressure outlet conduit 112 which communicates with, and supplies pressure fluid to, the flow selector valve 22, when the valve core 107 is positioned to connect the conduit 94 to the pressure inlet 109, the pressure outlet conduit 112 is connected to an exhaust port 113. A pressure actuated piston 114, which is disposed within a chamber 115 associated with the valve 23, is arranged so that it is engageable with the core 107 for urging the same leftwardly into the position effecting connection between the conduit 94 and the inlet pressure conduit 109. A pulse conduit 116 is connected between the power cylinder 29 and the chamber 115 for directing pressure fluid into said chamber to effect said movement of the piston 114. The other end of the valve core 107 is provided with an actuating rod 117 which extends away from the valve structure 23 toward, and preferably substantially coaxial with, the actuating rod 106 on the piston 99.

As shown in Figures 1, 2 and 4, a vertical pivot post 118 is supported upon the end wall 84 of the shift lock housing 65, and a bell crank 120, comprising a pair of levers 121 and 122, is supported upon the post 118 for pivotal movement with respect to said housing 65. The lever 121 of bell crank 120 is provided with an adjustment screw 123 (Figure 2) which is located thereon in alignment with and for contact by the adjacent, outer end of the actuating pin 85 of the lock bar end segment 82. The lever 122 is disposed so that its outer end intersects the common axis of the actuating rod 106 and actuating rod 117.

The power cylinders 28 and 29 are preferably, but not necessarily, substantially identical in structure and operation. Accordingly, a detailed description will be given of the power cylinder 29, and such will be understood to apply in substance to the power cylinder 28. The suffix "a" may be applied to numerals indicating certain parts in the cylinder 28 when referring to corresponding parts in the cylinder 29.

The power cylinder 29 has a piston 124 (Figure 1, 5 and 6), which is axially elongated and slidably disposed within a piston chamber 125. The piston 124 has a wide, annular recess 126, which, when the piston 124 is in its rightward or extended position, as shown by the piston 124a in Figure 6, connects the pulse conduit 116 to an exhaust port 127. Said piston 124 has an internal valve chamber 128 with a pressure inlet opening 129 (Figure 6) which is aligned with the pressure inlet 132 of the piston chamber 125. A check valve 133 within the chamber 128 is continuously urged by the spring 134 to close the inlet opening 129.

The chamber 128 in the piston 124 has a pressure outlet passageway 135 which opens radially through the side wall of the piston 124 at a point spaced axially from the recess 126. The wall of the piston chamber 125 is provided with a shallow annular groove 136 which communicates with the pulse conduit 116. The pressure outlet passageway 135 in the piston 124 communicates with this groove 136 when the piston 124 is in its retracted or leftward position as shown in Figure 6. The piston 124 has a pawl 137 (Figures 5 and 6) which is pivotally supported thereon for movement about an axis perpendicular to a plane defined by the parallel, lengthwise axes of the pistons 124 and 124a. The pawl 137 is movable into, and out of, a position where it will engage the teeth 138 on the ratchet wheel 139. The ratchet wheel 139 is disposed within a housing 142 (Figures 5 and 6) which is associated with the power cylinders 28 and 29. Resilient means such as the spring 140 continuously urges the pawl 137 into the teeth engaging position. The stop block 141 is secured on the rightward end wall 130 of the ratchet housing 142 for engagement by the pawl 137 as the piston 124 is extended. Such engagement prevents overtravel and thereby controls the rotation of the ratchet wheel 139.

The annular groove 136 (Figure 6) is connected by a conduit 143 to a similar groove 136a in the wall of the piston chamber 125a, which contains the piston 124a. The pawl 147 pivotally supported upon the piston 124a is preferably identical in construction and operation to the pawl 137 on the piston 124. The pawl 147 (Figures 5 and 6) is movable into and out of a position where it will engage the ratchet wheel 148, which, as shown in Figures 5 and 6, is substantially identical to the ratchet wheel 139 and located within the housing 142. The ratchet wheels 139 and 148 are secured, one above the other, upon the shaft 149, which is connected coaxially to the rotary core 159 of the flow selector valve 22 (Figures 1 and 5). The pistons 124 and 124a are preferably arranged (Figures 5 and 6) so that their respective pawls 137 and 147 will engage the respective ratchet wheels 139 and 148 on diametrical opposite sides of the shaft 149. Accordingly, the ratchet wheels 139 and 148 are arranged upon said shaft 149 for operation in counter rotational directions. Thus, operation of the piston 124 will effect a rotation of the shaft 149, hence, the selector valve core 150 in one rotational direction, whereas operation of the piston 124a will effect a rotation of the selector valve core in the opposite rotational direction.

As shown in Figures 5 and 7, the rotary core 159 of the flow selector valve 22 is provided with a plurality of spaced detent notches 151 arranged equidistantly from the axis of said core for snug reception of a spring loaded detent 159 in a substantially conventional manner. Said detent is located in one of said notches when the pressure fluid passageway 152 in said core 150 (Figure 1) is properly aligned with one of the control ports 153 to 158, inclusive, in the housing of the selector valve 22.

The pressure fluid passageway 152 in the flow selector valve 22 (Figures 1 and 5) is in continuous communication with the pressure outlet conduit 112. A plurality of control ports (Figures 1 and 7), which are hereinafter referred to as the reverse port 153, the neutral port 154, the first gear port 155, second gear port 156, third gear port 157 and fourth gear port 158, are connectible, one at a time, to said pressure fluid passageway 152 by appropriate rotation of the core 150. The reverse port 153 is connected, as by means of the conduit 87 (Figure 1), to the shift cylinder 15, the other end of said cylinder 15 being connected through the conduit 87a to the low pressure side of the pressure fluid system. The neutral port 154 is connected by the conduit 104 to the clutch control valve 24. The first and second gear ports 155 and 156, respectively, are connected to the opposite ends of the shift cylinder 16 by the conduits 88 and 88a. The third and fourth gear ports 157 and 158, respectively, are connected to the opposite ends of the shift cylinder 17 by the conduits 92 and 92a. The pressure conduit 112 is connected by the conduits 161 and 162 to the respective rightward ends of the piston chambers 125a and 125 of the power cylinders 28 and 29.

The pressure inlet opening 132 (Figure 6) into the piston chamber 125 and the pressure inlet opening 163 into the piston chamber 125a are connectible through the valve cores 166 and 167, of the solenoid valves 32 and 31, respectively, and by the conduits 164 and 165 (Figure 1) to the source 21 of the pressure fluid. Said inlet openings 132 and 163 are alternatively connectible by the valve cores 166 and 167 to the exhaust ports 168 and 169, respectively. The solenoid valves 31 and 32 are electrically connected by the conductors 172 and 173, respectively, through the relays 34 and 33, respectively, to a source of energy, such as the battery 44. When the relays 33 and 34, which are normally open, are deenergized, the valve cores 166 and 167 are connected to the exhaust ports 168 and 169. When said relays 34 and 33 are energized, hence closed, said solenoid valves 31 and 32, respectively, will be energized whereby the source 21 will be connected through inlet conduits 164 and 165 to the power cylinders 28 and 29.

D. Electrical control system

The electrical system "Y" (Figure 1) which serves primarily to operate one or the other of the solenoid valves 31 and 32, includes the normally open relays 33 and 34, and the battery 44. The battery 44 is connected by the conductor 174 and through the ignition switch 46 to the armature or supply tap 175 on the rotary circuit selector switch 38, the armature 43 of which is ganged with the core 150 of the flow selector valve 22. The conductor 174 is connected in turn by the conductor 176 to the supply or armature tap 177 of the control switch 178 for the visual indicator 42. The switch 178 has an armature 180 which is ganged with the armature 43 of the circuit selector switch 38, as indicated in Figure 1. The armatures 43 and 180 are in continuous contact with the supply taps 175 and 177, respectively, in a substantially conventional manner.

The relays 33 and 34 include normally open switches 183 and 184 which are located in the conductors 173 and 172, respectively. The switches 183 and 184 are operated by the windings 185 and 186 which may be closed by energy supplied from the battery 44 in several different ways.

The winding 186 of the upshift relay 34 is connected by a conductor 187 to the forward terminal 188 of the manually operable direction switch 40 (Figure 1). As shown in the drawing, the armature 189 of said direction switch 40 is in neutral when it is in its solid line position and is in forward drive when in its broken line position. When in said drive position, the armature 189 connects the terminal 188 to the terminal 192. As indicated by the capital letters B, and B', the terminal 192 is connected by the conductor 193 to the upshift tap 194 on the selector switch 38. The upshift tap 194 is engageable by the armature 43 of said selector switch 38 when said armature is in the neutral position indicated by "N" in Figure 1, along the periphery of the switch 38.

The conductor 187 is connected by the conductor 195 to the neutral terminal 196 of the drive direction switch 41. When the armature 197 of the direction switch 41 is in its solid line, neutral position, it connects the terminal 196 to the terminal 198 which, as indicated by the letters D and D', is connected by the conductor 199 to the tap 200 on the selector switch 38. The tap 200 is engageable by the armature 43 when it is in the reverse position, as indicated by the letter "R" along the periphery of the switch 38.

The winding 186 is also connected by a conductor 203 to the normally open, speed responsive, upshift governor switch 37. The governor switch 37, the structure of which is described in detail hereinafter, is connected by a conductor 204 through the normally closed, hold switch 205 to the upshift tap strip 206 on the selector switch 38. The tap strip 206 is engageable by the armature 43 when said armature is in the first, second and third gear positions, as indicated along the periphery of the switch 38. The hold switch 205 may be a manually operable toggle switch mounted, as shown in Figure 1, upon the remote control panel "Z," which may be disposed in the operator's compartment of a vehicle or the like in which the transmission 10 is installed.

The winding 185 of the relay 33 (Figure 1) is connected by the conductor 210 to the neutral position terminal 211 of the manually operable direction switch 40. The armature 189 of the switch 40, when in its neutral, solid line position, connects the terminal 211 to the terminal 212 which, as indicated by the capital letters A and A' in Figure 1, is connected by the conductor 213 to the tap 214 of the selector switch 38. The tap 214 is positioned so that it will be contacted by the armature 43 when, and only when, said armature is in first gear position.

The conductor 210 is connected through the downshift governor switch 35 and thence by the conductor 215 to a tap strip 216 on the selector switch 38. The tap strip 216 is engaged by the armature 43 when it is in the second or third gear positions which are indicated along the periphery of the selector switch 38 in Figure 1. The conductor 210 is also connected through a speed sensitive governor switch 36 and thence by the conductor 217 to a tap strip 218 on said selector switch 38. Said tap strip 218 is engageable by the armature 43 when it is in the fourth gear position. The governor switches 35 and 36, which are normally closed, may be substantially identical in structure with said governor switch 37, and are described in detail hereinafter. As will become apparent from such description, the two downshift governor switches 35 and 36 are utilized in this particular embodiment in order to obtain a different speed ratio between third and fourth speeds than between first and second, and second and third speeds. Thus, if identical speed ratios would be acceptable throughout the forward drive range, a single downshift governor switch would be adequate and the tap strips 216 and 218 could be combined and connected to such single governor switch.

The conductor 210 is also connected by the conductor 222 to the reverse terminal 223 of the direction switch 41. When the armature 197 of the switch 41 is in its broken line, reverse position (Figure 1), it connects the terminal 223 to the terminal 224 which is in turn connected, as indicated by the letters C and C', to the reverse tap 225 of the selector switch 38 by the conductor 226. The tap 225 is engageable by the armature 43 when it is in said neutral position, as shown in Figure 1.

The visual indicator 42 (Figure 1) has six lamps 227 which are connected by suitable conductors 228 to taps 229, which are engageable by the control switch armature 180 on the control switch 178. The taps 229 are arranged so that the armature 180 will engage the appropriate tap to illuminate the particular lamp 227 which corresponds, as indicated by the markings adjacent thereto, to the gear position of the selector switch 38, hence of the transmission 10. The conductors 228 are connected after passing through the lamps 227 to ground. The lamps 227, the hold switch 205 and the drive direction switches 40 and 41 are preferably mounted upon the instrument panel Z of the vehicle or other mechanism with which the transmission 10 is installed. Electro-responsive devices other than lamps may be used on the visual indicator 42, if desired.

E. The governor switches

As stated above, the governor switches 35, 36 and 37 may be, and preferably are, substantially the same in structure. Accordingly, one such switch (here the switch 35) is described in detail hereinafter and such description will be understood to apply in substance to the other switches. However, it will be recognized that the governor switches 35, 36 and 37 may differ in structure from each other without departing from the scope of this invention.

The said governor switch 35 (Figure 8, 9 and 11) has a cylindrical casing 235 containing a pair of preferably cylindrical chambers 236 and 237, which are separated by the partition 238. The governor chamber 237 houses a coaxial rotor 239 having an integral shaft 242 which extends through, and is rotatably supported within a suitable opening through the lower end wall 243 of the chamber 237, as appearing in Figure 9 and coaxial with the casing 235 thereof. The rotor 239 is provided with a plurality, here four, of radially disposed slots 244, Figures 9 and 11, which are uniformly spaced around said rotor and open through the periphery, as well as one axial end, thereof. Four rigid balls 245 are radially, movably disposed within these slots 244 and are of such size that they will extend both radially and axially from said slots 244 when they are disposed adjacent to the inner ends 246 of said slots.

A circular cap 247 within said chamber 237 has an integral, coaxial shaft 248 which extends therefrom slidably and rotatably into an appropriate, coaxial recess 249 in the upper, axial end of said rotor 239. Said cap 247 has a downwardly extending, annular flange 252 integral with the periphery thereof. Said flange has a downwardly diverging, conically shaped, inner surface 253 which is simultaneously and continuously engageable with said balls 245.

A reciprocable member 254 (Figure 9) has a shaft 255 which slidably and rotatably extends into, and through, an opening 257 in the partition 238 and coaxial with the cap 247. A plurality of bearing rollers 256 are rotatably supported upon said reciprocable member 254 between it and said cap 247. Said rollers 256 are arranged with their axes disposed radially of said cap 247 to permit said cap to rotate with respect to, and with a minimum of interference from, the reciprocable member 254. Also, said member 254 is constructed so that it can move axially of said casing 235 under the urging of said cap 247 and in a manner set forth in detail hereinafter.

As shown in Figures 9, 10 and 12, the switch chamber 236 has an upper axial end wall 259 upon the lower surface of which is mounted a channel shaped hanger 260. A micro-switch 261 is pivotally supported upon, and between, the flanges of the hanger 260 by means of the pivot rod 262 for movement about an axis transversely disposed with respect to the extended axis of the reciprocable member 254. An actuating arm 263 is disposed between the micro-switch 261 and the partition 238 and extends across the end of the shaft 255 on the reciprocable member 254. Said arm 263 has near one end a pair of flanges 264 and 265, which are pivotally supported upon the pivot rod 262. The other end of said arm 263 has an upwardly extending, integral finger 266, which is engaged with one end of the spiral spring 267, the other end of the spring 267 being engaged by the flange 268 on a tension screw 269. Said screw 269 is conveniently threadedly received through an appropriate, threaded opening in the end wall 259 and preferably has a lock nut 270 disposed thereon externally of the end wall 259.

The arm 263 is provided with a distortion, such as the dimple 273 (Figures 9 and 10), preferably about midway between the ends thereof. Said dimple 273 extends downwardly toward, and is engageable by, the upper end of the shaft 255. Thus, reciprocation of the shaft 255 will result in pivotal movement of the actuating arm 263, which is held in continuous engagement with said shaft 255 by the spring 267.

The switch 261 (Figures 10 and 12) is provided with, and operated by, a plunger 274 which is axially parallel with the extended axis of the shaft 255. Said plunger is engageable by the actuating arm 263 at a point disposed between, and spaced from, the dimple 273 and the pivoted end of said actuating arm 263. An adjustment screw 275 is threadedly received through an appropriate opening in the upper end wall 259 and is preferably provided with a suitable lock nut. The screw 275 is engageable at its lower end with a block 276 mounted upon the upper side of the micro-switch 261, and preferably at a point directly above the plunger 274.

The governor switches 36 and 37 (Figure 1) may be, and preferably are, constructed in a manner substantially as disclosed hereinabove with respect to the governor switch 35. The shafts 242, 242a and 242b of the switches 35, 36 and 37, respectively, are connected by appropriate linkage, such as gearing, indicated in broken lines at 277 and 277a to the transmission input shaft 11. In this particular embodiment, the downshift governor switches 35 and 36 are normally closed and the upshift governor switch 37 is normally open. More specifically, the governor switches 35 and 36 each have a switch section 261 (Figure 12) which is closed when the lever is in its lower position. However, the switch section 261 in governor switch 37 is open when the lever 263 is in its lower position.

In order to obtain a varation in the forward shift sequence, the downshift governor switch 35 may, for illustrative purposes, be set to close when the input shaft 11 rotates at less than 1100 r.p.m., and the downshift governor switch 36 closese when the input shaft 11 rotates at less than 2200 r.p.m. The upshift governor switch 37 closes when the input shaft 11 rotates in excess of 2500 r.p.m. However, it will be understood that these specific rotational speeds are set forth for illustrative purposes only since they will normally be a function of the specific type, and desired service, of the engine 45 with which the transmission 10 is utilized. It will also be recognized that, by using various types of gearing 277 and 277a, the rotor speeds of the governor switches 35, 36 and 37 may vary as and if desired from the transmission input speeds.

OPERATION

Component parts of the mechanism

The substantially standard transmission 10, shown in Figure 1, has been adapted, as described above, for operation by the automatic shift control mechanism, which includes the fluid control system "X," the electrical control system "Y," and the remote control system or panel "Z." These systems, as well as the transmission 10, are in turn comprised of component parts or units, the operation of which is advantageously considered independently before considering the operation of the entire automatic transmission. Accordingly, particular attention is first directed to the operation of several of these units.

As shown in Figures 1 and 2, the director valve 23 and clutch control valve 24 both operate in close cooperation with the shift lock mechanism 19 and the bell crank 120 supported thereon. The core 107 of the director valve 23 is moved by the piston 114 upon the appearance of pressure fluid in the conduit 116 from a rightward position (Figure 1), wherein it connects the conduit 109 with the conduit 112, to a leftward position (Figure 1A), wherein the conduit 109 is connected with the conduit 94.

The lever 122 is simultaneously engageable by the actuating rods 106 and 117 on the piston 99 and core 107, respectively, and the lever 121 is engageable by the pin 85. Thus, when the transmission is in gear, the pin 85 is extended and effects a counter-clockwise (as seen in Figure 1) movement of the bell crank 120, whereby its lever 122 contacts the end 106 to move the core 105 of the clutch valve 24 leftwardly. When the transmission returns to neutral, the pin 85 retracts and permits a clockwise movement of the bell crank, whereby the core 105 can return rightwardly and, in some parts of an operating sequence, effects simultaneous movement, rightwardly of the core 107 of the director valve 23.

The neutral control valve 25 (Figure 1), which normally connects the conduit 63 to the exhaust port 91 when the clutch is engaged, is operated by the same linkage 89 which connects the clutch 26 to the declutching cylinder 90. When pressure fluid appears in the conduit 102, the cylinder 90 operates through the linkage 89 first to disengage the clutch 26 and then to operate the valve 25 so that the conduit 63 is connected to the conduit 93. The valve 25 will connect the conduit 63 to said exhaust port 91 as soon as engagement of the clutch 26 is commenced by exhausting the conduit 102 and the cylinder 90.

The neutral cylinder 18 (Figures 1 and 3) is arranged so that, when pressure fluid enters the housing 61 from the conduit 63, the pistons 59 and 60 will be separated. This will cause the neutralizing members 57 and 58 to move against opposite sides of the guide stop 64 and thereby align the shift locators 56 and their attached shift rods in the neutral position. When the conduit 63 is depressurized, the pistons can then be moved toward each other.

The solenoid valve 31 (Figure 1) is arranged so that, when its solenoid is deenergized, its core 166 connects the exhaust port 168 to the fluid inlet 163 (Figure 6) of the piston chamber 125a in the power cylinder 28. When said valve 31 is energized, the core 166 connects the inlet 163 to the conduit 164, which leads to the source 21 of pressure fluid. Thus, when the solenoid valve 31 is energized, pressure fluid will flow from said source through the pressure inlet 163 into the piston chamber 125a. However, if the opposite end of the chamber 125a is also connected to the source 21 through the conduit 161 (Figure 6), the piston 124a will remain in its retracted, Figure 1 position. Since the inlet opening 129a is aligned with the fluid inlet 163, the pressure fluid will open the check valve 133a and enter the chamber 128a. With the piston 124a in the retracted position, pressure fluid will pass from the chamber 128a through the outlet passageway 135a, the annular groove 136a and into the conduit 143 with the check valve 133 in valve chamber 128 preventing exhaust through core 167.

As soon as the pressure is cut off from the conduit 161, the piston 124a will be extended into the position shown in Figures 1B and 6. This will disconnect the outlet passageway 135a from the groove 136a and permit pressure fluid in the conduit 143 to exhaust through the groove 136a, the annular recess 126a and the exhaust port 127a. The extension of the piston 124a will also cause the pawl 147 on the piston 124a to engage the ratchet wheel 148 and rotate it from one position thereof to the next successive position. Such movement is controlled both by engagement of said pawl with the stop block 141a and by the reception of the detent 159 into one of the notches 151 in the core 150 (Figure 7).

When the solenoid valve 31 is deenergized, its core 166 connects the chamber 125a to the exhaust port 168, and the check valve 133a closes. Now, when pressure fluid returns to the conduit 161, the piston 124a is retracted. The pawl 147 pivots on the piston 124a to clear the ratchet wheel 148 as said piston is retracted. The pawl spring 140a, which resiliently resists such pivoting, returns the pawl to its position for again engaging and rotating said ratchet wheel.

The operation of the solenoid valve 32, the power cylinder 29 and the pawl 137 to effect rotation of the ratchet wheel 139 is substantially identical to that described above with respect to the valve 31, cylinder 28 and pawl 147. Thus, the wheels 139 and 148 and the shaft 149 on which said wheels are mounted, will be rotated in one direction by the pawl 147 and in the opposite direction by the pawl 137.

The core 150 of the flow selector valve 22, the armature 43 of the selector switch 38 and the armature 180 of the control switch 178 are ganged with, and operable by, the ratchet wheels 139 and 148, in response to operation of the power cylinders 28 and 29. Accordingly, for example, when the transmission 10 is in neutral position (Figure 1) as a result of the flow selector valve 22 being in neutral position, the switch 38 and the control switch 178 will also be in their neutral positions.

The selector switch 38 is arranged so that its armature 43, which is connected to the battery 44, is always in contact with one or another of the conductors, whereby some shift of the transmission 10 can be effected in response to an appropriate signal from one of the governor switches 35, 36 and 37, or one of the drive direction switches 40 and 41. At this point, it will be assumed that the ignition switch 46 and the hold switch 205 are closed, which is the normal operating condition. It will be observed that when the armature 43 is in reverse position, operation of the forward direction switch 40 will be ineffective upon the electric circuitry. Likewise, operation of the reverse direction switch 41 will be similarly ineffective when the armature 43 is in any forward gear position.

The manually operated hold switch 205 disconnects the upshift governor from the selector switch and thereby permits use of the transmission as a brake when running downhill. It may also be manually opened to prevent hunting of the control mechanism between two gear positions where the input shaft speed signals an upshift, but the load is too great for the higher gear to maintain the required input speed.

The speed sensitive governor switches 35, 36 and 37 (Figures 9, 11 and 12) all depend for their operation upon the effect of the centrifugal force created by rotation of the rotor 239. As the rotor 239 rotates, the balls 245 move radially outwardly against the conical, inner surface 253 of the flange 252, thereby causing the cap 247 to move upwardly against the reciprocable member 254. In turn, the member 254 engages the actuating arm 263 and causes it to pivot upwardly, against the contrary urging of the spring 267, until the microswitch 261 is operated. Where the switch 261 is normally closed, as in the case of the governors 36 and 35, operation of the switch 261 by upward movement of the lever 263 will open said switch. Hence, reduction of the rotor speed below a selected value permits said switch 261 to close. However, in the case of governor 37, the switch 261 remains open until said lever moves upwardly and closes it. The amount of force required to operate the switch 261 can be controlled by the tension screw 269, and the amount of axial movement required by the reciprocable member 254 to effect said operation of the switch 261 can be controlled by the adjustment screw 275.

Attention is now directed to the automatic operation of the transmission 10 by the entire control mechanism with particular attention to the sequence of operations occurring.

*"At rest" position*

In order to provide a starting point for describing the sequence of operations, the "at rest" condition of the apparatus will be first described, which condition will be understood to be the condition when the machine, as a road vehicle, in which a given transmission is installed, is stopped and the transmission control apparatus is deenergized. Under normal operating conditions in the "at rest" position of the transmission 10 and its shift control mechanism, the drive direction switches 40 and 41 will be in their neutral, solid line positions of Figure 1 and the hold switch 205 will be closed. The switch 46 will be open and the solenoids 31 and 32 will, consequently, be in their deenergized positions with their associated cores 166 and 167 connecting the piston chambers 125a and 125, respectively, to exhaust.

Where, as is usual, the pressure fluid source 21 is an engine-driven pump, said source 21 will be deenergized because the engine 45 is stopped in the "at rest" condition. Thus, the positions of the various parts, whose operation is dependent upon pressure fluid, will be the same as they were at the termination of the preceding operation of the transmission.

The armature 43 (Figure 1) will be in neutral position where it engages the taps 194 and 225. The core 150 of valve 22, being ganged with the armature 43, will be in its neutral position also. The valve 98 will be closed by the spring 103. The power cylinder 90 will be depressurized and consequently the clutch 26 will be engaged and the neutral control valve 25 will connect the conduit 63 to the exhaust port 91.

The core 107 of the director valve 23 is in its rightward position where it was moved by the piston 99 acting through the lever 122 and the rod 117. The pistons 124 and 124a will be in their leftward positons. The relays 33 and 34, and the governor switch 37, will be open, and the governor switches 35 and 36 will be closed.

When the switch 46 is closed and the engine is started, the transmission controls become energized and ready for operation, as in Figure 1.

With the closing of switch 46, current will flow through the conductor 174 and the conductor 176 from the battery 44 to the armature 180 of the control switch 178, and thence through a tap 229 and the conductor 228 to the neutral light in the visual indicator 42 and to ground. Thus, the neutral light will be energized, thereby indicating the condition of the transmission. With the relays 33 and 34 open, the solenoid valves 31 and 32 will connect their corresponding associated power cylinders 28 and 29 to exhaust.

With the starting of the engine, ad consequent energizing of the source 21, pressure fluid will move from the source 21 through the conduit 109, the director valve 23 and the conduit 112 to the flow selector valve 22. Said valve 22 will direct such pressure fluid through the conduit 104 to the piston chamber 97 of the clutch control valve 24, whereby the piston 99 is urged leftwardly to open the valve 98.

The conduits 161 and 162 will direct pressure fluid from the pressure conduit 112 to the rightward ends of the power cylinders 28 and 29, respectively, whereby the pistons 124 and 124a will be held in their retracted positions. Since the clutch 26 is engaged the engine output shaft 27 will be connected to the transmission input shaft 11 during neutral position, which condition has a number of evident advantages, including the ability to warm the transmission oil by agitation thereof prior to operation and the possibility of starting a vehicle by pushing if its battery is down.

Accordingly, with the engine 45 operating, the transmission input shaft 11 and the countershaft 47 will be rotating. However, since the transmission 10 is in neutral, the main shaft 9 will not be rotating. The shift rods 12, 13 and 14 will be in their neutral position whereby the actuating pin 85 will be urged into its retracted position by the spring 83 (Figure 4). Accordingly, the bell crank 120 will be free to pivot about the axis of the pivot post 118 between the opposing ends of the actuating rod 106 and the actuating rod 117.

*Neutral to first gear*

When it becomes desirable to drive the vehicle, with which the engine 45 is associated, in a forward direction, such is accomplished by moving the armature of the direction switch 40 out of the neutral position and into its drive position, shown in broken lines in Figure 1. Inasmuch as the armature 43 (Figure 1) of the selector switch 38 is still in neutral position, thereby contacting the tap 194, current can now flow from the battery 44 through the conductor 174 to the center tap 175 on the selector switch 38 thence through the armature 43 and the conductor 193 to the terminal 192 of the switch 40. With the armature 189 in its forward position, such current flows through the armature 189 to the terminal 188 and thence through the conductor 187 and the winding 186 of the relay 34 to ground. Such energization of the winding 186 causes the switch 184 to close, thereby connecting the battery 44 through the conductor 172 and solenoid 31 to ground.

Energization of the solenoid 31 causes the core 166 to move into the position (Figure 1A) where it connects the conduit 164 from the pressure source 21 to the pressure inlet 163, which communicates with the pressure inlet opening 129a in the piston 124a. Since, as shown in Figure 1, pressure from the source 21 is still within the conduits 161 and 162, this same pressure appearing within the pressure inlet opening 129a will not extend the piston 124a. However, inasmuch as the pressure produced by the source 21 is greater than that amount required to depress the spring 134a, the check valve 133a is opened thereby permitting pressure fluid to flow into the chamber 128a and thence out therefrom through the outlet passageway 135a into the annular groove 136a in a manner disclosed in Figure 6 with respect to corresponding parts of the power cylinder 29.

The pressure fluid (Figure 6) then passes from the annular groove 136a through the conduit 143 to the annular groove 136 and thence through the conduit 116 into the piston chamber 115 associated with the director valve 23, which causes the piston 114 to move the core 107 leftwardly (Figure 1A). Such movement acts through the lever 122 to pivot the lever 121 away from the actuating pin 85, and acts through the piston 99 at least momentarily to move the valve core 98 away from the adjacent end of the passageway 95. Leftward movement of the core 107 disconnects the conduit 112, hence the conduits 161, 162 and 104, from the conduit 109, while directing pressure fluid into the conduit 94 and thence through the conduit 93 into both the sequencing valve 25 and into the passageway 95 of the clutch control valve 24.

By cutting off the flow of pressure fluid to the conduit 161 (Figure 1A), the pressure fluid flowing through the solenoid valve 31 and into the piston chamber 125a can now cause the piston 124a to move rightwardly (Figure 1B) whereby the ratchet wheel 148 is engaged and rotated by the pawl 147. Rotation of the ratchet wheel 148, acting through the shaft 149, causes the core 150 of the flow selector valve 22 to rotate said core 150 until the pressure fluid passageway 152 therein moves into alignment with the first gear port 155 (Figure 7). The detent 159 and detent notch 151 associated with port 155 will tend to align said passageway 152 with the port 155.

Referring back to Figure 1A, it will be seen that while the conduit 109 is still connected through the valve 23 to the conduit 94, the pressure fluid will flow from conduit 94 through valve 24 and the conduit 102 into the declutching cylinder 90. The resulting operation of cylinder 90, acting through the linkage 89 connected thereto, first disengages the clutch 26 and then operates the neutral control valve 25 whereby pressure fluid within the conduit 93 can flow through the valve 25 into the conduit 63 and thence into the neutral pressure cylinder 18. Thus, the neutral cylinder cannot be operated until the valve 25 has been closed by the clutch 26 being substantially disengaged.

The pressure in cylinder 18 will act through the pistons 59 and 60 to move the neutralizing members 57 and 58 toward each other. During such movement, the members 57 and 58 will engage the shift locator 56 on any shift rod in a shifted position and move it into neutral position. Inasmuch as the transmission 10 was in the neutral position at the outset of this particular operation, the movement of the neutralizing members 57 and 58 will not have any effect upon the location of the shift rods 12, 13 and 14.

Movement of the rotary core 150 into the first gear position, as shown in Figure 1B, depressurizes the conduit 104, thereby permitting the pressure within the conduit 94 and the passageway 95 to move the piston 99 and its rod 106 rightwardly within the piston chamber 97. The rod 106 engages the lever 122, which in turn engages the adjacent end of the actuating rod 117, thereby moving the core 107 back into its rightward position. Any fluid within the chamber 115 or the conduit 116 can, during the return movement of the piston 114, exhaust through the annular groove 136, the conduit 143, the annular recess 126a and the exhaust port 127a. Before the core 107 returns fully to the position where it blocks the flow of pressure fluid into the conduit 94, the actuating rod 105 on the piston 99 will be moved rightwardly, away from the valve core 98, by pressure entering the leftward end of chamber 97. Accordingly, as soon as the pressure in the cylinder 90 and in the conduit 102 have somewhat stabilized, the spring 103 will close the valve 24 (Figure 1C). Thus, when the core 107 cuts off the flow of pressure fluid into the conduit 94, the valve 24 will continue to hold the pressure in the conduit 102 and in the declutching cylinder 90, thereby holding the clutch 26 disengaged. The clutch may be also, if desired, pedally held disengaged by the operator while the truck is stopped and reengaged as needed to meet the operator's wishes. Rightward movement of the core 107 also depressurizes lines 63, 93, and 94 and accordingly depressurizes the neutral cylinder 18 through said lines and out at exhaust port 108.

When the operator is ready for the truck to start moving, the armature 43 of the selector switch 38 and the armature 180 of the indicator switch 178 will be moved into the first gear position (Figure 1B) along with the core 150 of the flow selector valve 22. Thus, the circuit through the tap 194 on the switch 38 will be broken, thereby deenergizing the relay 34 and permitting the core 166 of the solenoid 31 to connect the piston chamber 125a to the exhaust port 168, as shown in Figure 1C. The clutch, if held disengaged by the operator, may be reengaged at this time.

The return of the core 107 in the valve 23 to its rightward position by action of the piston 99 permits pressure fluid to flow through the conduit 109 and the conduit 112 into the conduits 161 and 162 (Figure 1C). Since the piston chamber 125a is now connected to the exhaust port 168, the appearance of pressure fluid in the conduit 161 immediately retracts the piston 124a. The pressure fluid in the conduit 112 also flows through the pressure fluid passageway 152 (Figures 5 and 7) in the rotary core 150 and the first gear port 155 of the flow selector valve 22, and thence through the conduit 88 into the left-hand end of the pressure cylinder 16 associated with the shift rod 13. This flow, which urges the shift rod 13 rightwardly, operates through the yoke 54 to initiate engagement between the shiftable gear 51 on the main shaft 9 and the gear 51a on the countershaft 47. Such rightward urging of the yoke 54 also engages suitable synchronizers (not shown) to effect synchronization of the gears 51 and 51a, and as soon as this is effected, the shift into first gear is completed.

Turning attention now to the clutch operation, it will be understood that substantial completion of movement of the shift rod 13, as aforesaid, by which the gears 51 and 51a are engaged, will be followed by movement of the lock ball 77a (Figure 4) into the lock bar opening 69, thereby urging the lock bar segments 78 and 82 toward the end wall 84. This causes the actuating pin 85 to engage the lever 121, whereby the bell crank 120 is pivoted counterclockwise, thus causing the lever 122, in turn, to engage the rod 106 (Figure 1D) and thereby move the valve core 98 leftwardly to open the valve 24. This permits the pressure fluid in the conduit 102 and declutching cylinder 90 to pass through the conduit 94 and escape through the exhaust port 108 of the director valve 23 and permit reengagement of the clutch.

Accordingly, as shown in Figure 1D, the transmission 10 has now been shifted into the first gear position and will remain so for all speeds up to a selected shift speed, which in the present embodiment is 2500 r.p.m. Reduction of the speed of rotation, even to stalling of the engine, will not change this position because the circuits including the two downshift governors, one of which must be energized to effect a downshift, are open through the selector switch 38 when the armature 43 thereof is in first gear position. Thus, with the input shaft 11 of the transmission 10 rotating at any speed not exceeding 2500 r.p.m. in this embodiment, nothing further will happen and the transmission control mechanism will remain as shown in Figure 1D.

*First gear to second gear*

If with the armature 43 in the first gear position (Figure 1D), the transmission input speed exceeds a predetermined value, as 2500 r.p.m. in this particular embodiment, the upshift governor switch 37 (Figure 9) will be closed, as described above. Such closure will complete the circuit from the battery 44 through the conductor 174, the armature 43, the tap strip 206, the conductor 204, the governor switch 37, the conductor 203, and the winding 186 in the upshift relay 34 to ground.

Energization of the winding 186 will close the switch 184 in the relay 34, as shown in Figure 1E, whereby the solenoid valve 31 will again be operated to position its core 166 so that pressure fluid can flow from the source 21 through the conduit 164, the chamber 128a in the piston 124a and thence the conduit 143 and conduit 116 into the piston chamber 115 of the director valve 23. This will cause the core 107 to move leftwardly to its Figure 1E position, thereby permitting pressure fluid to flow from the conduit 109 into the conduits 94 and 93, and stopping its flow into the conduit 112 and conduit 161. Accordingly, and as shown in Figure 1F, pressure fluid will flow through the clutch control valve 24 into the declutching cylinder 90, whereby the clutch 26 is disengaged (Figure 1G) and the neutral control valve 25 is operated to permit the flow of pressure fluid from the conduit 93 through the conduit 63 and into the neutral cylinder 18. This causes the neutralizing members 57 and 58 to be moved toward each other and, in so doing, engage the shift locator 56 on the shift rod 13, whereby it is again moved into the neutral position. This permits the shift lock 19 (Figure 4) to move into its neutral position pending the shifting of the transmission into a new gear position.

At about the same time as pressure is applied to neutralize, the shift rod 13, the pressure fluid within the conduit 161 will exhaust through the conduit 112 and the exhaust port 113 of the director valve 23, thereby permitting pressure fluid to pass through the solenoid valve 31 and operate the piston 124a. This causes its pawl 147 to engage and rotate the ratchet wheel 148, and thereby shift the rotary core 150 of the flow selector valve 22 so that the pressure fluid passageway 152 will be in alignment with the second gear port 156.

During the movement of the core 150 into the second gear position, pressure fluid will flow from conduit 94 into the leftward end of the piston chamber 97 and urge the piston 99 rightwardly. However, so long as the transmission is in a shifted position, the pin 85 will be extended, thus preventing clockwise movement of the bell crank 120 and thereby holding core 105 against rightward movement. As soon as the transmission returns to neutral, the pin 85 retracts and permits the bell crank to rotate clockwise in response to urging from the core 105 and thereby engaging core 107 to move it rightwardly. Thus, the core 107 will be returned to a position exhausting conduit 94, and thereby exhausting also the neutral cylinder 18. Movement rightwardly of the core 107 will also direct the flow of pressure fluid into the conduits 112 and 161. Accordingly, pressure fluid will flow from the source 21 (Figure 1G) through the conduits 109 and 112, through the passageway 152 in core 150, and through the conduit 88a into the rightward end of the pressure cylinder 16 and urge the parts toward second gear position. Fluid can exhaust from the other end of the pressure cylinder 16 through the conduit 88 and the first gear port 155 of the flow selector valve 22.

As soon as the clutch 26 is disengaged and while synchronization is occurring between the next gears to be engaged, such as the gears 51 and 62 (Figure 1H), the input speed will drop below the setting of the upshift governor switch 37, thereby opening it, at least momentarily. This will deenergize the upshift relay 34 and the solenoid valve 31, whereby the pressure in the conduit 161 will be able to return the piston 124a to its retracted position. Completion of the shift on attainment of synchronization again extends pin 85, rotates bell crank 120 counter-clockwise, moves core 105 leftwardly and opens valve 98 to depressurize the declutching cylinder 90 and permit reengagement of the clutch. Thus, the shift of the transmission into second gear (Figure 1H) is completed.

Second gear to third gear

With the shift control mechanism in the second gear position, the armature 43 of the selector switch 38 will not only continue to engage the tap strip 206 connected to the upshift governor 37, but will also engage the tap strip 216 of the downshift governor 35. Thus, either of these governors will be able to effect a shift of the transmission, depending upon whether the speed of the input shaft 11, to which they are both connected, is increased or decreased, respectively. If, in this embodiment, the input speed then remains between 1100 and 2500 r.p.m., neither governor will be operated.

If, however, as the truck or other vehicle gathers speed, the input shaft 11 again exceeds the 2500 r.p.m. value the governor 37 will again close and thereby operate the solenoid 31 whereby an upshift from second gear to third gear position is carried out in substantially the same manner as set forth above with respect to the upshift from first gear to second gear. With the shift control mechanism in third gear position the armature 43 will continue to engage both of the tap strips 206 and 216. Thus, it will be seen that the armature 43 always closes the circuit of the governor switch 37 when it closes the circuit of the governor switch 35 and either of the governor switches 35 and 37 (governor switch 36 being then out of the active circuit in both second and third gear) will again be able to initiate a shift if the input speed departs from the range between the speeds for which said governors are set, as between 1100 and 2500 r.p.m.

If the transmission 10 is shifted to the fourth gear position, the armature 43 will then engage the tap strip 218, only, which is connected only to the downshift governor 36. Thus, only a decrease in r.p.m. will produce a shift out of fourth gear. The governor 36 is, in this embodiment, set to effect such a shift if the input speed drops below 2200 r.p.m.

The upshifting operation, from one gear position to the next gear position, when signaled by the upshift governor switch 37, will require enough time that the transmission input shaft 11 will be retarded to a value below the setting of the upshift governor 37 before the clutch 26 is reengaged. However, the shift in the transmission will also be sufficiently rapid that it will be completed well before the input speed of the input shaft 11 can retard to a point where it will call for a downshift.

Second gear to first gear

The downshifts from fourth gear to third gear, from third gear to second gear and from second gear to first gear are all substantially similar to each other and all may be sufficiently described by consideration of only the downshift from second gear to first. All of these downshift operations are started by the speed of rotation of the input shaft of the transmission being reduced to a preselected level as determined by the setting of the particular governor connected to the selector switch 38 in a given gear position, governor 36 being connected when the transmission is in fourth gear position and governor 35 being connected when the transmission is in third and second gear positions.

Thus, with the transmission in second gear, if the speed of the input shaft 11 drops below the minimum required for a downshift such as 1100 r.p.m., the switch 261 (Figure 12) in the downshift governor 35 will close. Since, as shown in Figure 1J, the armature 43 is contacting the tap strip 216, closure of the downshift governor switch 35 will close a circuit from the battery 44 through the conductor 174, the armature 43, the tap strip 216, the conductor 215, conductor 210 and the coil 185 of the downshift relay 33 to ground. This will close the switch 185, thereby energizing the solenoid valve 32, as shown in Figure 1J. Thus, pressure fluid can flow from the source 21 through the chamber 128 in the piston 124 and thence through the conduit 116 into the director valve 23 thereby shifting the core 107 leftwardly to connect the conduit 109 to the conduit 94, while permitting the depressurization of the conduit 112 through the port 113. This will energize the clutch operating cylinder 90 (Figure 1K) to disengage the clutch 26 and also effect a substantially simultaneous actuation of the piston 124 whereby the pawl 137 is caused to engage the ratchet wheel 139 and thereby rotate the flow selector valve 22 counterclockwise into the first gear position.

The pressure in the conduit 94 will cause the piston 99 to urge the core 105 of the valve 24 back toward its rightward position and as soon as the transmission returns to neutral position and the pin 85 retracts, the bell crank 120 is free to rotate and permit rightward movement of the core 105 to take place. This acts through the lever 122 to effect rightward movement of the core 107, which both terminates the supply of pressure to line 94 and connects line 94, and thereby also the neutral cylinder 18, to exhaust. Such movement of the core 107 also permits pressure fluid from line 109 to flow into the conduit 112 and through the flow selector valve 22 and the conduit 88, into the pressure cylinder 16 for shifting the transmission 10 rightwardly into the first gear position, as shown in Figure 1D. During synchronization for the downshift into first gear position, the speed of the input shaft 11 will rise above the minimum r.p.m. of the downshift governor 35 thereby opening said downshift governor switch. This will deenergize the downshift relay 33 whereby the solenoid valve 32 is deenergized and disconnects the pressure source 21 of pressure fluid from the power cylinder 29. Accordingly, the pressure within the conduit 112 can pass through the conduit 162 and retract the piston 124, as shown in Figure 1D.

When the shift rod 13 moves into its shifted position, the shift lock 19 causes the bell crank 120 to open the valve 98 in the clutch control valve 24 thereby exhausting the cylinder 90 and permitting reengagement of the clutch 26 in the same manner as set forth above.

It will be recognized that, where the upshift limit and the downshift limit are close together, as 2500 r.p.m. and 2200 r.p.m., as in the cases of the governor switches 37 and 36, respectively, in the embodiment herein referred to, hunting may occur between two shift positions under some circumstances. In other words, the input speed to the transmission may get to a point where it will produce a demand for an upshift, but the torque requirement upon arriving at the higher gear position may be so great as to immediately produce a retard that will necessitate a downshift. In order to prevent such hunting, the normally closed hold switch 205 can be manually opened, thereby preventing an upshift even if the governor 37 is actuated and closes its switch. It will be seen that this opening of hold switch 205 affects only the circuit of upshift governor 37 and hence it will not prevent a downshift of the transmission if such is required by the input speed dropping below that required by the particular downshift governor switch connected at a given time.

*First gear to neutral*

A continued reduction in the speed of the input shaft 11 will be incapable of producing a further downshift because the circuits including the two downshift governor switches 35 and 36 are open through the selector switch 38 when the armature 43 thereof is in the first gear position. Accordingly, a shift of the transmission 10 from the first gear position to the neutral position can be accomplished only by manually moving the armature 189 of the direction switch 40 from its forward drive position (Figure 1D) to its neutral position, as shown in solid lines in Figure 1.

Connection of the terminal 211 to the terminal 212 in the switch 40 completes the circuit from the battery 44 through the conductor 174, the selector switch 38, the conductor 213, the conductor 210 and the winding 185 of the relay 33, whereby the transmission control mechanism causes the transmission to shift from first gear position to the neutral position in a manner substantially the same as described hereinabove with respect to the shift from the second gear position to first gear position.

*Neutral to reverse*

In shifting the transmission 10 into reverse gear, the direction switch 40 remains in neutral position, as shown in Figure 1, and the direction switch 41 is moved into its lower position (Figure 1L). This connects the terminals 223 and 224 of the switch 41 whereby the circuit is completed from the battery 44 through the conductor 174, the armature 43, the conductor 226, the switch 41, the conductor 222, the conductor 210 and the winding 185 of the downshift relay 33 to ground. This closes the relay 33 whereby the solenoid 32 is energized from the battery 44 through the conductor 173. Thus, pressure fluid from the source 21 flows through the solenoid valve 32, the pressure cylinder 29 and the conduit 116 to operate the director valve 23 whereby the flow of pressure through the conduit 112 is cut off and pressure fluid is permitted to flow through the conduit 94, thereby disengaging the clutch 26 and substantially simultaneously actuating the piston 124 rightwardly due to the depressurization of the conduit 112 and conduit 162.

The actuation of the piston 124 effects a rotation of the ratchet wheel 139 whereby the rotary core 150 and the armature 43 are moved into the reverse gear position, as shown in Figure 1M. This is followed almost immediately by actuation of the piston 99 whereby the core 107 of the valve 23 is again operated in the same manner as above described to shut off the flow of pressure fluid into the conduit 94 and reconnect it to the conduit 112. Movement of the armature 43 off of the tap 225 of the selector switch 38 disconnects the circuit through the winding 185 thereby deenergizing the relay 33 as well as the solenoid valve 32. Accordingly, the pressure now appearing in the conduit 112 due to the rightward shift of the core 107, as shown in Figure 1N, will act through the conduit 162 to retract the piston 124, while at the same time flowing through the pressure fluid passageway 152 and the conduit 87 into the pressure cylinder 15 to effect a shift in the rod 12, as shown in Figure 1N.

*Reverse to neutral*

The transmission will remain in the reverse position until the direction switch 41 is again moved into the upper neutral position of Figure 1. This will close the circuit from the battery 44 through the conductor 174, the armature 43, the conductor 199, the armature 197 of the switch 41, the conductor 195, the conductor 187 and the winding 186 of the relay 34 to ground. Thus, the switch 184 of said relay 34 is closed, thereby energizing the solenoid valve 31 to initiate an upshift of the control mechanism, hence, the transmission 10 is substantially the same manner as set forth hereinabove with respect to the upshift from the neutral position to the first gear position.

As mentioned hereinabove, the armature 180 of the control switch 178 is ganged with the armature 43 of the selector switch 38. Thus, current can flow from the battery 44 through conductor 174, the conductor 176, and the armature 180 of the control switch 178 to the particular tap 229 engaged by said armature, and thence through its associated conductor 228 to the corresponding lamp 227 and to ground, whereby such lamp is illuminated and in all cases indicates the correct gear position of the transmission.

*Alternate electrical control*

It will be recognized that the control mechanism (Figure 1), set forth hereinabove in detail for operating the transmission 10, may be modified in many respects while remaining within the concepts of the invention. By way of example, the electrical control system "Y" may be replaced with an alternate electrical control system "Y'" as shown in Figure 13. In general, the alternate electrical control system "Y'" is substantially the same as the control system "Y" and varies therefrom primarily in details of circuitry. The alternate control system "Y'" includes governor switches 35, 36 and 37, a selector switch 38a, a visual indicator 42 and a pair of manually operable drive direction switches 40 and 41. The governor switches 35 and 36 are here arranged to be normally open. Accordingly, the relay 33a is normally closed.

The selector switch 38a (Figure 13) differs from its counterpart 38 in the system "Y" in that the tap strip 216a is engageable by the armature 43a when it is in the first gear position. Also, the selector switch 38a is provided with an arcuate tap strip 280 which is engageable by said armature 43a in the reverse gear position, neutral position and first gear position. The tap strip 280 is connected by the conductor 281 through the switch 282 of the normally closed relay 283 and the winding 185a of the relay 33a to ground. The winding 284 of the relay 283 is connected by the conductor 285 to the terminals 211 and 223 of the direction switches 40 and 41, respectively. In all other respects, including the arrangement of the visual indicator 42, the direction switches 40 and 41, and the relay 34a, the alternate system "Y'" is identical to the electrical control system "Y."

The alternate electrical control system "Y'" will operate in substantially the same manner as set forth hereinabove in detail with respect to the electrical control system "Y," shown in Figure 1. The primary difference resides in the specific manner in which the relays 33a and 34a are operated. If the switches 40 and 41, and the transmission 10 are in neutral position when the ignition switch 46 is closed, current will flow through the conductor 174, the armature 43a, the tap strip 280, the normally closed relay 283, the conductor 281, and the coil 185a of the normally closed relay 33a, thereby opening such relay and preventing the flow of current therethrough. If, as shown in Figure 13, the armature 189 of the direction switch 40 is moved into the forward solid line position, current will also flow from the battery 44 through the conductor 174, the armature 43a, the conductor 193, the switch 40, the conductor 187 and the coil 186a of the relay 34a, thereby closing such relay and energizing the solenoid valve 31. This results in an upshift of the transmission in substantially the same manner as set forth in detail hereinabove with respect to the structure shown in Figure 1.

Movement of the armature 189 of the direction switch 40 back into its broken line position, as shown in Figure 13, will close a circuit from the battery 44 through the conductor 174, the armature 43a, the conductor 213, the switch 40, the conductor 285 and the coil 284 of the relay 283 to ground, thereby opening the switch 282 and deenergizing the coil 185a of the relay 33a. Thus, the normally closed relay 33a is permitted to close, thereby energizing the solenoid valve 32 which commences a shift of the transmission into neutral in the manner set forth in detail hereinabove with respect to the structure shown in Figure 1.

The alternate electrical control system "Y'" has the additional relay 283 and tap strip 280 which are necessary for a normally closed downshift relay 33a. This arrangement has the disadvantage of increasing the possibility of a failure in the system, but has the advantage of assuring at least one downshift if a power failure occurs in the circuit of the winding 185a.

Several specific details have been utilized herein for illustrative purposes, referring particularly to the reference at several points throughout the above description to the speeds at which the transmission is set to shift from one gear setting to another gear setting. It will be recognized that these specific references are only for illustrative purposes and that they may be varied widely within the scope of the present invention. Other details, such as the number of gear settings, number and magnitude of different speeds at which shift functions will take place, and the specific arrangement of both electrical and pressure fluid circuits may all be varied widely without departure from the scope of the present invention.

Further, it will be appreciated that the specific transmission herein utilized is of conventional character and that the only operating connections thereto are to conventional shift yokes and to conventional clutch operating means. Accordingly, it will be recognized that the entirety of the herein disclosed control mechanism can be made as a unit separate from the transmission structure for subsequent mounting as convenient, as on the transmission housing, and may be readily adapted to fit any transmission structure with which it is to be used. Further, the electrical system and the hydraulic system may be made independently of each other as sub-assemblies and subsequently assembled together, all in line with the teaching of the present invention.

Thus, although particular, preferred embodiments of the invention have been disclosed and described in detail hereinabove for illustrative purposes, it will be recognized that variations or modifications thereof are fully contemplated unless specifically stated to the contrary in the appended claims.

We claim:

1. A shift effecting and controlling device applicable to a transmission unit having a plurality of shiftable elements therein and associated with a serially connected clutch, said elements having neutral positions in which they are incapable of transmitting power, comprising in combination: an electrical system including a source of electrical potential and a pair of speed responsive maximum and minimum switches connectible to said source of potential, said electrical system also including a manually operated on-off switch serially connected with said source and said speed responsive switches; a pair of electrically responsive fluid control valves, each respectively serially connected to said speed responsive switches for actuation respectively thereby; a source of fluid under pressure; a pressure fluid selection system including a selector valve having an inlet connected to said last named source and a plurality of outlets and pressure fluid responsive means arranged for moving said selector valve stepwise in one or the other of respectively opposite directions in response to actuation respectively of one or the other of said electrically responsive valves; disconnect means also responsive to actuation by either of said electro-responsive valves for disengaging said clutch; neutralizing means for placing said elements in said neutral positions and means for operating said neutralizing means in response to disengagement of said clutch, the flow of pressure fluid to the inlet of said selector valve being blocked until said neutral positions are at least substantially reached; shift cylinders mechanically connected to said shiftable elements and independently connected to the respective outlets of said selector valve whereby upon attainment of said neutral positions, pressure fluid will be directed by said selector to a selected one of said shift cylinders and the shiftable element connected thereto will be urged into its shifted position.

2. The device defined in claim 1 including a normally closed manual switch serially connected with one of said speed responsive switches for preventing the occurrence of one shift sequence regardless of the position of the speed responsive switch.

3. A device for automatically shifting the gears of a transmission having a plurality of shiftable elements, comprising: a plurality of fluid actuated shift mechanisms for effecting selective shifts of said elements; a source of fluid under pressure; selector means movable for directing the flow of fluid to selected ones of said shift mechanisms one at a time from said source; fluid operated actuator means connected to said source for effecting movement of said selector means; electrically operated valve means for controlling the flow of fluid from said source to said fluid operated actuator means and electrically operable means for operating said valve means; a source of electrical energy; electrical means including a pair of switches operable upon the occurrence of one of two predetermined input speeds of said transmission for connecting said electrically operated means to said energy source to thereby operate said valve means; and switch means for connecting said source of energy to said electrical means.

4. The structure of claim 3, including a visual indicator having an armature connected to said source of energy and movable with said selector means.

5. The structure of claim 3, wherein said fluid actuated shift mechanisms comprise: a plurality of pressure fluid cylinders, each having a piston therein; a plurality of shift rods respectively secured to, and axially movable by, said pistons; and pressure operated means connected to said fluid operated actuator means for simultaneously moving all of said shift rods into neutral positions, said movement into said neutral positions occurring at a point in the shifting sequence immediately ahead of the supplying of pressure fluid to a selected one of the fluid actuated shift mechanisms.

6. The structure of claim 3 including pressure fluid actuated means for shifting said transmission into a condition incapable of transmiting power, a first valve operated in response to the operation of said electrically operated valve means for interrupting the flow of fluid to said selector means, and a second valve operated in response to operation of said first valve for controlling the flow of fluid from said first valve to said pressure fluid actuated means.

7. The structure of claim 3 wherein said selector means includes a member movable in two directions, and said fluid operated actuator means includes two pressure actuated mechanisms responsive to the flow of fluid through said electrically operated valve means for moving said movable member in one of said directions according to which of said last named mechanisms is energized at a given time.

8. The structure of claim 3, wherein said electrically operated valve means includes a pair of valves each of which has an operating solenoid and said electrical means comprises a pair of parallel circuits, each circuit including an operating solenoid for one of said valves, a relay for energizing each operating solenoid and a speed sensitive switch mechanically connected to the input end of said transmission for energizing each of said relays in response to the speed of said input end and wherein said switch means includes manually operable means for alternatively energizing said parallel circuits.

9. The structure of claim 3, wherein said electrical means includes a pair of governor controlled switches mechanically connected to the input shaft of said transmission, said governor switches being arranged to initiate upshifts and downshifts, respectively, at said predetermined input speeds.

10. A device for automatically shifting the gears of a transmission associated with a clutch and having a plurality of shift rods movable into neutral positions, the combination comprising: pressure fluid responsive shift mechanisms arranged for selectively moving said shift rods; pressure responsive disconnect means for disengaging said clutch; neutralizing means for moving said shift rods into said neutral positions and means for operating said neutralizing means in response to disengagement of said clutch; a source of pressure fluid; selector means movable for connecting one of said pressure fluid responsive shift mechanisms at a time to said source; a pair of pressure fluid operated actuator mechanisms arranged for effecting selected, opposite movements of said selector means; a pair of electrically operated valves arranged for controlling the flow of pressure fluid from said source to said pressure fluid operated actuator mechanisms; electrical mechanism, including a pair of switches responsive to the input speed of said transmission, for operating one of said valves at a time; and a secondary pressure fluid system connected to said source during the initial flow of fluid to said pressure fluid operated actuator mechanisms, for operating said pressure responsive disconnect means before any one of said pressure responsive shift mechanisms is operated.

11. A device for automatically shifting the gears of a transmission associated with a clutch and having a plurality of shift rods movable into neutral positions, the combination comprising: pressure fluid operated shift mechanisms arranged for moving said shift rods out of their neutral positions; means including a pressure fluid operated, neutral cylinder arranged for moving said shift rods into said neutral positions; pressure fluid responsive means for disengaging said clutch; a source of pressure fluid; selector means movable for connecting one of the shift mechanisms at a time to said source; a pair of pressure fluid operated actuator mechanisms for effecting movement of said selector means; a pair of electrically operated valves for controlling supply of pressure fluid to said actuator mechanisms for operating same whereby flow of fluid may be directed through said selector means to a selected one of said pressure fluid operated shift mechanisms; electrical mechanism, including a pair of switches respectively responsive to maximum and minimum input speeds of said transmission, for respectively operating one of said valves at a time whereby exceeding a predetermined maximum speed will actuate one valve to effect a shift in one direction and dropping below a predetermined minimum speed will actuate the other valve to effect a shift in the other direction; and a secondary pressure fluid system connected to said source in response to the initial flow of fluid to said actuator mechanisms for operating said pressure responsive means for disengaging said clutch and then operating said neutral cylinder to place said shift rods in their neutral positions before any one of said shift mechainsms is operated.

12. A device for automatically shifting the gears of a transmission associated with a clutch and having a plurality of shift rods movable into neutral positions, the combination comprising: a plurality of pressure fluid operated shift cylinders arranged for moving said shift rods out of their neutral positions; a pressure fluid operated neutral cylinder and means operated in response to supply of pressure fluid thereto for moving said shift rods into their neutral positions; pressure fluid operated means for disengaging said clutch; a source of pressure fluid; a selector valve having a movable core for connecting one of the shift cylinders at a time to said source; a pair of piston chamber's having pistons arranged therein for respectively moving said valve core in opposite directions; a pair of electrically operated valves arranged for respectively connecting said piston chambers to said source of pressure fluid for moving said pistons alternatively; electrical mechanism, including a pair of switches responsive to the input speed of said transmission, for operating one of said electrically operated valves at a time; and a secondary pressure fluid system including first means connected to said piston chambers and responsive to the initial flow of pressure fluid thereinto for operating said pressure operated means to disengage said clutch and second means responsive to disengagement of said clutch for supplying pressure fluid to said neutral cylinder for placing said shift rods in their neutral positions before any one of said shift cylinders is operated.

13. The structure of claim 12 including a director valve in said secondary pressure fluid system for disconnecting said selector valve from said source while said source is connected to said secondary system whereby said shift rods substantially reach said neutral positions before pressure is applied to a shift cylinder.

14. The structure of claim 13 wherein each of said piston chambers is connected to said source on both sides of said piston therein when said selector valve is connected to said source, thereby preventing such movement of said pistons by said pressure fluid which effects a movement of said core.

15. The structure of claim 12 wherein each of said pistons has an internal chamber continuously connected with the pressure fluid admitted through its corresponding electrically operated valve but connecting the pressure fluid with said secondary system only when said piston is in a selected position in a sequence of operation prior to operation of said selector valve core.

16. The structure of claim 12 wherein said first means in said secondary pressure fluid system includes a clutch control valve movable to one position in response to the initial flow of pressure fluid through said electrically operated valves into said chambers for passing pressure fluid from said source to said pressure fluid operated means and means for simultaneously urging said clutch control valve to its opposite position wherein it blocks supply of pressure fluid to said pressure fluid operated means, and wherein said transmission has a shift lock mechanism and means operable thereby for preventing said clutch control valve from being placed in said opposite position until said transmission gears are substantially fully disengaged.

17. The structure of claim 12 wherein said second means in said secondary pressure fluid system includes a neutral control valve arranged for normally blocking the flow of pressure fluid to said neutral cylinder and operable by said pressure fluid operated means, substantially upon disengagement of said clutch, for permitting the flow of said pressure fluid to said neutral cylinder.

18. The structure of claim 12 including a shaft; a pair of ratchet wheels coaxially mounted upon said shaft and arranged for rotating said shaft in opposite directions, wherein said selector valve has a rotary core coaxially connected to said shaft, and wherein one of said pistons is engageable with one of said ratchet wheels for rotating said core in one direction and the other piston is engageable with the other ratchet wheel for rotating said core in the opposite direction.

19. The structure of claim 12, wherein said electrical mechanism includes a selector switch having an armature movable with said core for controlling the energization of said speed responsive switches, and a pair of manually operable drive direction switches controlling the energization of said selector switch.

20. The structure of claim 12 wherein said first means in said secondary pressure fluid system includes a clutch control valve operated in response to the initial flow of pressure fluid through said electrically operated valves into said chambers for passing pressure fluid from said source to said pressure operated means and for simultaneously urging the blocking of said pressure, and wherein said transmission has a shift lock mechanism and means operable thereby for preventing the blocking of said flow of pressure fluid through said clutch control valve until said transmission gears are substantially fully disengaged, said shift lock mechanism again opening said clutch control valve for permitting escape of said pressure fluid therethrough when said transmission gears are reengaged.

21. A device for automatically shifting the shiftable elements of a transmission, comprising: a plurality of fluid actuated mechanisms for selectively shifting said elements; a source of fluid under pressure, selector means movable for connecting said source to any one of said mechanisms; fluid operated actuator means connected to said source for effecting movement of said selector means; electrically operated flow control means for controlling the flow of fluid from said source to said actuator means and electrical operator means for operating said flow control means; a source of electrical energy; and speed responsive electrical switch means for connecting said electrical operator means to said energy source in response to the occurrence of either one of two predetermined input speeds of said transmission so that said flow control means will be operated to supply fluid to said actuator means and thereby cause movement of said selector means; said switch means, said flow control means and said actuator means being arranged so that said selector means will be moved in different manners in response, respectively, to the occurrences of said two input speeds.

22. The structure of claim 21 wherein said selector means is a rotary valve having a plurality of ports, and said fluid operated actuator means includes a pair of pistons for rotating said valve in opposite rotational directions.

23. A device for automatically shifting the shiftable elements of a transmission, comprising: a plurality of fluid actuated shift mechanisms connected to said elements for effecting shifts thereof; a source of fluid under pressure; selector means movable for connecting said source to any one of said shift mechanisms; a pair of fluid operated actuators connected to said source for effecting opposite movements of said selector means, electrically operated flow control means for controlling the flow of fluid from said source to said actuators and electrical operator means for operating said flow control means; a source of electrical energy; and speed responsive electrical switch means responsive to either one of two predetermined input speeds of said transmission for connecting said electrical operator means to said energy source so that said flow control means will supply fluid to one or the other of said actuators in response to one or the other of said input speeds whereby said selector will be moved in one direction or the opposite direction in response to said input speeds.

24. A device for automatically controlling the operation of a transmission associated with a clutch and having a plurality of shiftable elements, comprising: a plurality of fluid actuated shift mechanisms for selectively shifting said elements; a source of fluid under pressure; selector means movable for connecting said source to any one of said shift mechanisms; fluid operated actuator means connected to said source for effecting movement of said selector means; a source of electrical energy; electrically operated flow control means for controlling the flow of fluid from said source to said actuator means and electrical operator means for operating said flow control means; speed responsive electrical switch means responsive to the occurrence of either one of two predetermined input speeds of said transmission for connecting said electrical operator means to said energy source so that said flow control means will be operated to supply fluid to said actuator means and thereby cause movement of said selector means; said switch means, said flow control means and said actuator means being arranged so that said selector means will be moved in different manners in response to the occurrences of said two input speeds; and pressure operated means for disengaging said clutch in response to the operation of said actuator means.

25. The structure of claim 24 wherein said shiftable elements are movable into neutral positions whereby said transmission is incapable of transmitting power; and wherein said device includes a pressure fluid operated mechanism for moving said shiftable elements into said neutral positions and means responsive to disengagement of said clutch for supplying pressure fluid to said mechanism.

26. In a device for automatically controlling the operation of a transmission associated with a clutch and having a plurality of shiftable elements connected to a plurality of fluid actuated shift mechanisms, said clutch being disengaged by fluid operated means responsive to the initial flow of pressure fluid to any one of said fluid actuated shift mechanisms and said shiftable elements being movable into neutral positions by pressure fluid operated mechanism and means responsive to the disengagement of said clutch for supplying pressure fluid to said last-named mechanism, control mechanism for said device comprising: a source of fluid under pressure; a rotary valve having a plurality of outlet ports connected to said fluid actuated shift mechanisms and an inlet port connected to said source of pressure fluid; a pair of fluid operated actuators connected to said source for selectively rotating said valve in opposite rotational directions; a pair of electrically operated means for controlling the flow of fluid from said source to said actuators respectively; and electrical means for connecting said electrically operated means to said energy source.

27. The structure of claim 26 wherein said electrical means includes a pair of speed sensitive switches mechanically connected to the input of said transmission, and a selector switch having an armature mechanically connected to said rotary valve, said selector switch being arranged to vary the operation of said electrical means in response to the movement of said rotary valve.

References Cited in the file of this patent

UNITED STATES PATENTS

| | | | |
|---|---|---|---|
| 1,818,910 | Sanine | Aug. 11, | 1931 |
| 1,911,599 | Bloxsom | May 30, | 1933 |
| 1,979,488 | Perez | Nov. 6, | 1934 |
| 2,115,097 | Durham | Apr. 26, | 1938 |
| 2,181,471 | Velo | Nov. 28, | 1939 |
| 2,210,237 | Fuhrer | Aug. 6, | 1940 |
| 2,252,009 | Kenny | Aug. 12, | 1941 |